United States Patent [19]

Hirota et al.

[11] Patent Number: 5,086,867
[45] Date of Patent: Feb. 11, 1992

[54] POWER TRANSMISSION APPARATUS

[75] Inventors: Isao Hirota; Masao Teraoka; Sakuo Kurihara; Mitsuru Hasegawa, all of Tochigi, Japan

[73] Assignee: Tochigifujisangyo Kabushiki Kaisha, Tochigi, Japan

[21] Appl. No.: 376,393

[22] Filed: Jul. 6, 1989

[30] Foreign Application Priority Data

| Jul. 8, 1988 | [JP] | Japan | 63-168856 |
| Jul. 12, 1988 | [JP] | Japan | 63-171910 |
| Jul. 12, 1988 | [JP] | Japan | 63-171912 |
| Jul. 28, 1988 | [JP] | Japan | 63-186991 |
| Sep. 27, 1988 | [JP] | Japan | 63-125134[U] |
| Oct. 31, 1988 | [JP] | Japan | 63-141182[U] |
| Dec. 26, 1988 | [JP] | Japan | 63-326074 |
| Jan. 31, 1989 | [JP] | Japan | 1-19535 |
| Jan. 31, 1989 | [JP] | Japan | 1-19540 |
| Apr. 28, 1989 | [JP] | Japan | 1-49703[U] |

[51] Int. Cl.$^5$ .................. B60K 17/43; B60K 20/04; F16D 35/02
[52] U.S. Cl. .................. 180/248; 180/233; 180/247; 180/250; 192/58 B; 475/86; 475/89
[58] Field of Search ............ 180/233, 247, 248, 250; 192/58 B; 475/86, 89, 237

[56] References Cited

U.S. PATENT DOCUMENTS

| 3,138,970 | 6/1964 | Costa et al. | 475/86 |
| 4,644,823 | 2/1987 | Muellea | 475/86 |
| 4,699,237 | 10/1987 | Matsumoto | 180/250 |
| 4,715,248 | 12/1987 | Gant | 475/86 |
| 4,788,888 | 12/1988 | Tsutsumikoshi | 280/250 |
| 4,790,211 | 12/1988 | Iwatsuki et al. | 180/247 |
| 4,811,628 | 3/1989 | Winkham et al. | 475/86 |
| 4,838,119 | 6/1989 | Teraoka et al. | 192/58 B |
| 4,862,769 | 9/1989 | Koga et al. | 475/86 |
| 4,909,345 | 3/1990 | Iwatsuki et al. | 180/250 |
| 4,914,980 | 4/1990 | Taureg et al. | 475/89 |

FOREIGN PATENT DOCUMENTS

| 0149302 | 7/1985 | European Pat. Off. . |
| 653814 | 12/1987 | Fed. Rep. of Germany . |
| 57-134045 | 8/1982 | Japan . |
| 63-13823 | 1/1988 | Japan . |
| 159136 | 7/1988 | Japan | 180/233 |

*Primary Examiner*—Mitchell J. Hill
*Attorney, Agent, or Firm*—Samuels, Gauthier & Stevens

[57] ABSTRACT

To simplify propeller shaft supporting structure and to reduce propeller shaft vibration when a viscous coupling and a clutch mechanism are both provided on a propeller shaft of a 4WD vehicle, the power transmission apparatus comprises a housing rotatably supported to receive power; a differential gear disposed on one side of and within the housing; a viscous coupling disposed on the other side of and within the housing; and a clutch for transmitting power from the housing to the differential gear via the viscous coupling when engaged, and transmitting no power from the housing to the differential gear when disengaged.

1 Claim, 25 Drawing Sheets

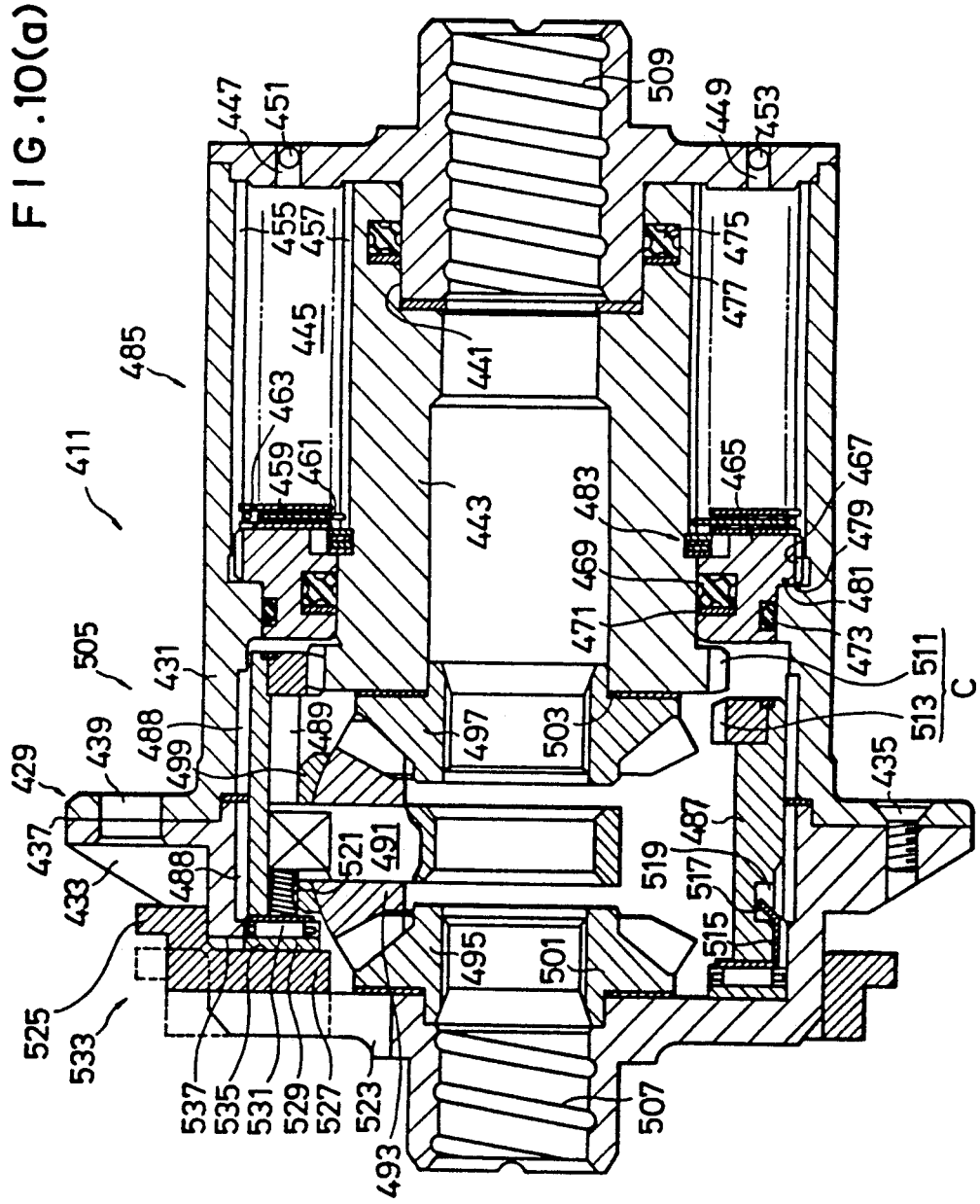
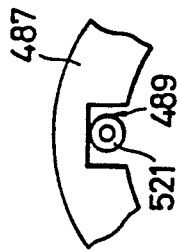
FIG.10(a)
FIG.10(b)

POWER TRANSMISSION APPARATUS

BACKGROUND OF THE INVENTION

1. Field of the Invention

The present invention relates to a power transmission apparatus suitable for use in automotive vehicles.

2. Description of the Prior Art

A front-drive (FF) base four-wheel-drive (4WD) vehicle is disclosed in Japanese Published Unexamined (Kokai) Patent Appli. No. 60-172764, for instance, in which a viscous coupling clutch and a clutch device are both arranged on the propeller shaft. In the case where engine power is intermittently transmitted to the wheels via a relatively long propeller shaft rotating at a high rotative speed, since the inertial moment is large and therefore vibration is easily produced, there exists a problem in that the propeller shaft must be supported by special support members when a power transmission is mounted in connection with the propeller shaft.

Further, a vehicle in which a viscous coupling is provided for a transfer of a 4WD vehicle is disclosed in Japanese Published Unexamined (Kokai) Patent Appli. No. 63-13823. In this case, although it is possible to solve the afore-mentioned vibration problem, since the viscous coupling is constructed separately from a differential gear, there exists another problem in that the propeller shaft supporting structure is rather complicated.

SUMMARY OF THE INVENTION

With these problems in mind, therefore, it is the primary object of the present invention to provide a power transmission apparatus simple in construction without producing vibration and without increasing load applied to the propeller shaft.

To achieve the above-mentioned object, a power transmission apparatus according to the present invention comprises: (a) a housing rotatably supported, for receiving drive power; (b) a differential gear disposed on one side of and within said housing, for differentially distributing the drive power; (c) a viscous coupling disposed on the other side of and within said housing, for transmitting the drive power via fluid viscous resistance; (d) and cutch means for transmitting the drive power from said housing to said differential gear via said viscous coupling when engaged and for transmitting no drive power from said housing to said differential gear or vice versa when disengaged.

The viscous coupling comprises an inner hub for receiving the drive power, and the clutch means comprises a slidable differential case for engaging and disengaging said inner hub with and from an input side of said differential gear. The apparatus further comprises another clutch means for transmitting directly the drive power from said housing to said differential gear and indirectly the drive power from said housing to said differential gear via said viscous coupling. The clutch means further comprises an actuator for operating said clutch means to engage/disengage positions, said actuator being mounted on a rear cover removably attached to an opening of a carrier for rotatably supporting said housing. The differential gear comprises a differential case, said clutch means being engaged/disengaged by shifting said differential case. The apparatus further comprises a lock means for locking differential operation of said differential gear.

BRIEF DESCRIPTION OF THE DRAWINGS

The features and advantages of the power transmission apparatus according to the present invention will be more clearly appreciated from the following description of the preferred embodiments of the invention taken in conjunction with the accompanying drawings in which:

FIG. 10($a$) is a cross-sectional view showing the sixth embodiment of the power transmission apparatus;

FIG. 10($b$) is an enlarged partial side view for assistance in explaining a clutch ring;

FIG. 29(b) is a cross-sectional view taken along the line XXVIII(b)—XXVIII(b) in FIG. 28(a)

DETAILED DESCRIPTION OF THE PREFERRED EMBODIMENTS

The power transmission apparatus according to the present invention will be described hereinbelow with reference to the attached drawings.

Figure 1:
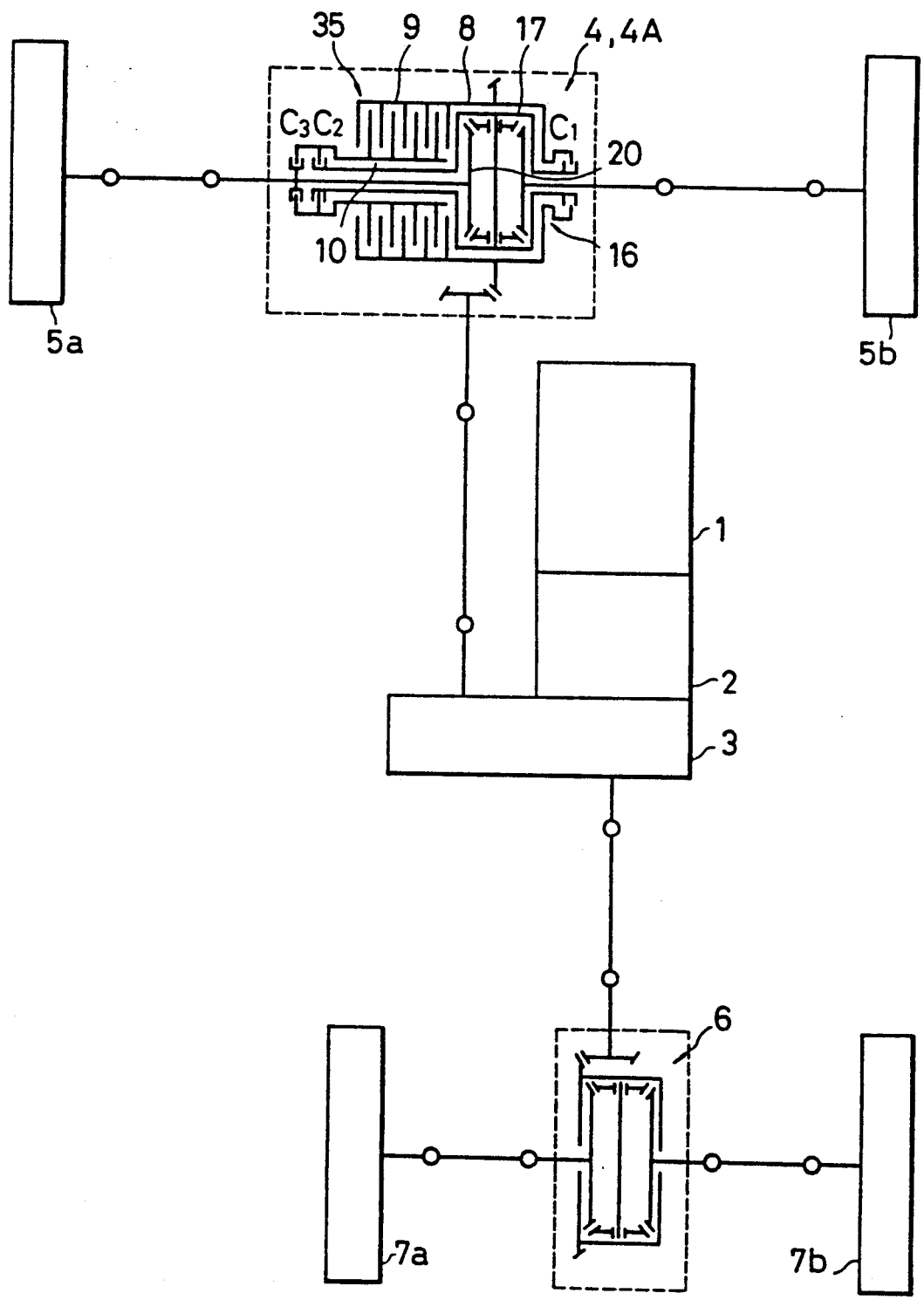
FIG. 1 is a skeletal view showing an automotive vehicle driving system to which first and second embodiments of the power transmission apparatus according to the present invention are applied.
Figure 2:
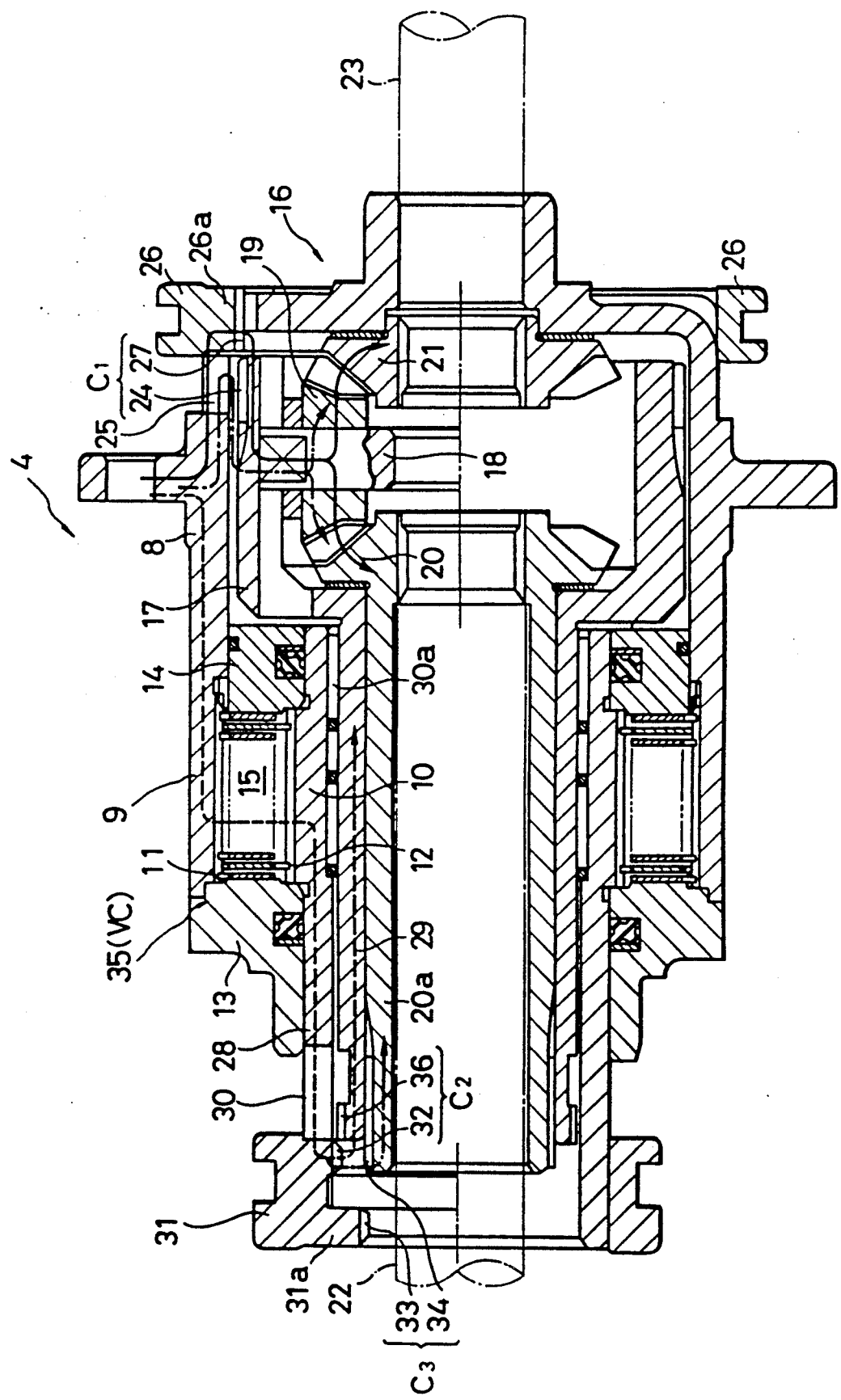
FIG. 2 is a cross-sectional view showing the first embodiment of the power transmission apparatus.

FIGS. 1 and 2 show a first embodiment of the present invention.

In FIG. 1, a drive power from an internal combustion engine 1 is transmitted to two front wheels 5a and 5b via a transmission 2, a transfer 3, and a first embodiment of the power transmission apparatus (four-wheel drive apparatus) 4 according to the present invention. In addition, the drive power is transmitted from the transfer 3 to two rear wheels 7a and 7b via a rear wheel side differential gear 6.

The four wheel drive apparatus 4 (the first embodiment) will be described hereinbelow with reference to FIG. 2. A drive power from the engine 1 is transmitted to a roughly cylindrical outer case 8. This outer case 8 is formed integral with a first cylindrical rotatable member (housing) 9 within which a second cylindrical rotatable member 10 is disposed. The inner circumferential wall of the first rotatable member 9 is formed with splines engaged with a plurality of first resistance plates 11. The outer circumferential wall of the second rotatable member 10 is also formed with splines engaged with a plurality of second resistance plate 12.

A first end wall member 13 and a second end wall member 14 are disposed on both the side ends of the two first and second rotatable members 9 and 10. The first end wall member 13 is fixed to an end of the first rotatable member 9. The second end wall member 14 is connected via splines to the first rotatable member 9. A working chamber 15 is formed by the first rotatable member 9, the second rotatable member 10, the first end wall member 13 and the second end wall member 14, and filled with a viscous fluid such as silicon oil. Therefore, a viscous coupling 35 is constructed by the above two rotatable members 9 and 10, the two end wall members 13 and 14, and the two resistance plates 11 and 12.

On the other hand, a front wheel side differential gear 16 is disposed within the outer case 8 to transmit a drive power from the outer case 8. The front wheel side differential gear 16 is composed of a differential case 17, pinion gears 19 rotatably supported by the differential case 17 via a pinion shaft 18, and two side gears 20 and 21 geared with the pinion gears 19. The two side gears 20 and 21 are connected via splines to the front side left side wheel drive shaft 22 and the front side right side wheel drive shaft 23. A gear 24 is formed on the outer right side (in FIG. 2) circumferential wall of the differential case 17. Further, an engage groove 25 extending in the axial direction of the right side wheel drive shaft 23 is formed in the outer case 8 at such a position as to be opposed to the gear 24 (rightward in FIG. 27). An engage piece 26a of a first roughly annular slidable member 26 is engaged with the engage groove 25. The first slidable member 26 is slidably mounted on the outer circumferential wall of the outer case 8. A gear 27 is formed on the inner circumferential surface of the engage piece 26a of the first slidable member 26 so as to be engageable with a gear 24 formed in the differential case 17. A fork (not shown) is engaged with the first slidable member 26. Therefore, when the first slidable member 26 is shifted toward the left in FIG. 2 by the fork coupled to a shift mechanism, the gear 24 is geared with the gear 27 to connect the outer case 8 with the differential case 17.

A first cylindrical drive member 28 is formed integral with the second rotatable member 10 on the left side in FIG. 2. A second roughly annular drive member 29 is rotatably supported via a needle bearing 30a within the first drive member 28. This second drive member 29 is formed integral with the differential case 17. Further, a cylindrical output shaft 20a formed integral with the side gear 20 is located within the second drive member 29. Further, an engage groove 30 extending in the axial direction of the left side wheel drive shaft 22 is formed on the left end side (in FIG. 2) of the first drive member 28. A second engage piece 31a of a second annular slidable member 31 is engaged with this engage groove 30. This second slidable member 31 is slidably mounted on the outer circumferential wall of the first drive member 28. Two gears 32 and 33 are formed at two different radial positions on the inner circumference of the first slidable member 31. The outer gear 32 is engageable with the gear 36 formed in the second drive member 29, and the inner gear 33 is engageable with the gear 34 formed in the cylindrical portion 20a. Further, the second slidable member 31 is engaged with a fork (not shown) coupled to a shift mechanism.

Here, when the first slidable member 26 is slid toward the left side (in FIG. 2), the gear 27 is engaged with the gear 24 of the differential case 17. In contrast, when slid toward the right side, the gear 27 is disengaged from the gear 24. Therefore, these two gears 27 and 24 constitute a first clutch $C_1$ for connecting and disconnecting the differential case 17 to and from the first rotatable member 9.

On the other hand, when the second slidable member 31 is slid toward the right side (in FIG. 2), the gear 32 is engaged with the gear 36. In contrast, when slid toward the left side, the gear 32 is disengaged from the gear 36. Therefore, these two gears 32 and 36 constitute a second clutch $C_2$ for connecting and disconnecting the differential case 17 to and from the second rotatable member 10.

In addition, when the second slidable member 31 is further slid toward the right side, the gear 32 is disengaged from the gear 36, and thereafter the gear 33 is engaged with the gear 34. In contrast, when the second slidable member 31 is slid toward the left side, the gear 33 is disengaged from the gear 34. Therefore, these two gears 33 and 34 constitute a third clutch $C_3$ for connecting and disconnecting the side gear 20 to and from the second rotatable member 10.

The operation of the apparatus thus constructed will be described hereinbelow.

In this apparatus, when the first, second and third clutches $C_1$, $C_2$, and $C_3$ are engaged or disengaged, a drive power from the engine 1 can be transmitted via different transmission routes, so that various drive conditions can be selected.

When the first slidable member 26 is slid toward the left side (in FIG. 2) via the fork coupled to the shift mechanism, the gear 27 of the first slidable member 26 is engaged with the gear 24 of the differential case 17. That is, the first clutch $C_1$ is engaged so that the differential case 17 and the first rotatable member 9 rotate together. Under these first clutch ($C_1$) engagement conditions, power is transmitted from the engine 1, via the transmission 2 and the transfer 3, to the outer case 8. The power transmitted to the outer case 8 is further transmitted to the differential case 17 via the first slidable member 26. The power transmitted to the differential case 17 is differentially transmitted to the left side drive shaft 22 and the right side drive shaft 23 via the pinion gear 19, the side gears 20 and 21 as shown by thick solid line in FIG. 2. Under these conditions, although power is transmitted to the first rotatable member 9, since the second rotatable member 10 and the first and second drive members 28 and 29 rotate together with the first rotatable member 9, the viscous coupling is disabled. Therefore, an engine power is transmitted to the front wheels 5a and 5b and the rear wheels 7a and 7b, respectively, via the transmission 2, the transfer 3, the front side differential gear 10, and the rear side differential gear 6.

When the first slidable member 26 is slid toward the right side (in FIG. 2), the first clutch $C_1$ is disengaged, so that the first rotatable member 9 is disengaged from the differential case 17.

Then, when the second slidable member 31 is slid toward the right side, the gear 32 of the second slidable member 31 is engaged with the gear 36 of the second drive member 29. That is, the second clutch $C_2$ is engaged so that the differential case 17 is connected to the second rotatable member 10. Once the second clutch $C_2$ is engaged, power transmitted to the outer case 8 (the first rotatable member 9) is transmitted to the first drive member 28 via the viscous coupling 35. Further, the power is transmitted to the second drive member 29 via the second slidable member 31, and then to the front wheels 5a and 5b via the differential gear 16 as shown by thick dashed line in FIG. 2. Therefore, a differential operation is effected between the front wheels 5a and 5b and the rear wheels 7a and 7b, so that it is possible to prevent the occurrence of tight corner braking phenomenon. In addition, since the viscous coupling 35 is operative, even if any one of the front and rear wheels 5a and 5b, and 7a and 7b is being idled, it is possible to transmit power to the other wheels not being idled.

When the second slidable member 31 is slid further toward the right side, the gear 33 of the second slidable member 31 is engaged with the gear 34 of the cylindrical portion 20a, and the gear 32 of the second slidable member 31 is disengaged from the gear 36 of the second drive member 29. Under these conditions, when the first slidable member 26 is slid leftward to engage the gear 24 with the gear 27, that is, when the first clutch $C_1$ and the third clutch $C_3$ are engaged, the differential case 17 is connected to the first rotatable member 9, and the second rotatable member 10 is connected to the side gear 20. Once the first and third clutches $C_1$ and $C_3$ are engaged, a power transmitted to the outer case 8 is transmitted to the front wheels 5a and 5b via the differential gear 16 as shown by thick dot-dashed line in FIG. 2.

When there exists a difference in rotative speed between the left side wheel drive shaft 22 and the right side wheel drive shaft 23 during an automotive vehicle travelling on a muddy road, the ralative rotation between the first rotatable member 9 and the second rotatable member 10 is limited by viscous resistance of the viscous coupling, so that the differential operation between the right and the left side wheel drive shafts 22 and 23 is limited to improve the travelling performance on a muddy road.

When the first slidable member 26 is slid rightward and the second slidable member 31 is slid leftward conversely, the first, second and third clutches $C_1$, $C_2$, $C_3$ are all disengaged. Under these conditions, an engine power is transmitted from the transfer 3 to only the rear wheels 7a and 7b via the rear wheel side differential gear 6, so that the vehicle is driven in the ordinary two rear wheel drive mode. In this case, the front wheels 5a and 5b are rotated by the moving vehicle when the rear wheels 7a and 7b are driven, and therefore the differential case 17 of the front wheel side differential gear 16 is rotated. However, since the clutch $C_1$ is disengaged, power will not be transmitted to the first rotatable member 9 of the viscous coupling 35; that is, the viscous coupling 35 is not rotated by the moving vehicle driven in two rear wheel drive mode, thus reducing travelling resistance, fuel consumption rate and vibration.

As described above, since the first, second and third clutches $C_1$, $C_2$ and $C_3$ are engaged or disengaged by shifting the first and second slidable members 26 and 31, it is possible to obtain appropriate drive conditions according to road and travelling conditions.

Figure 3:
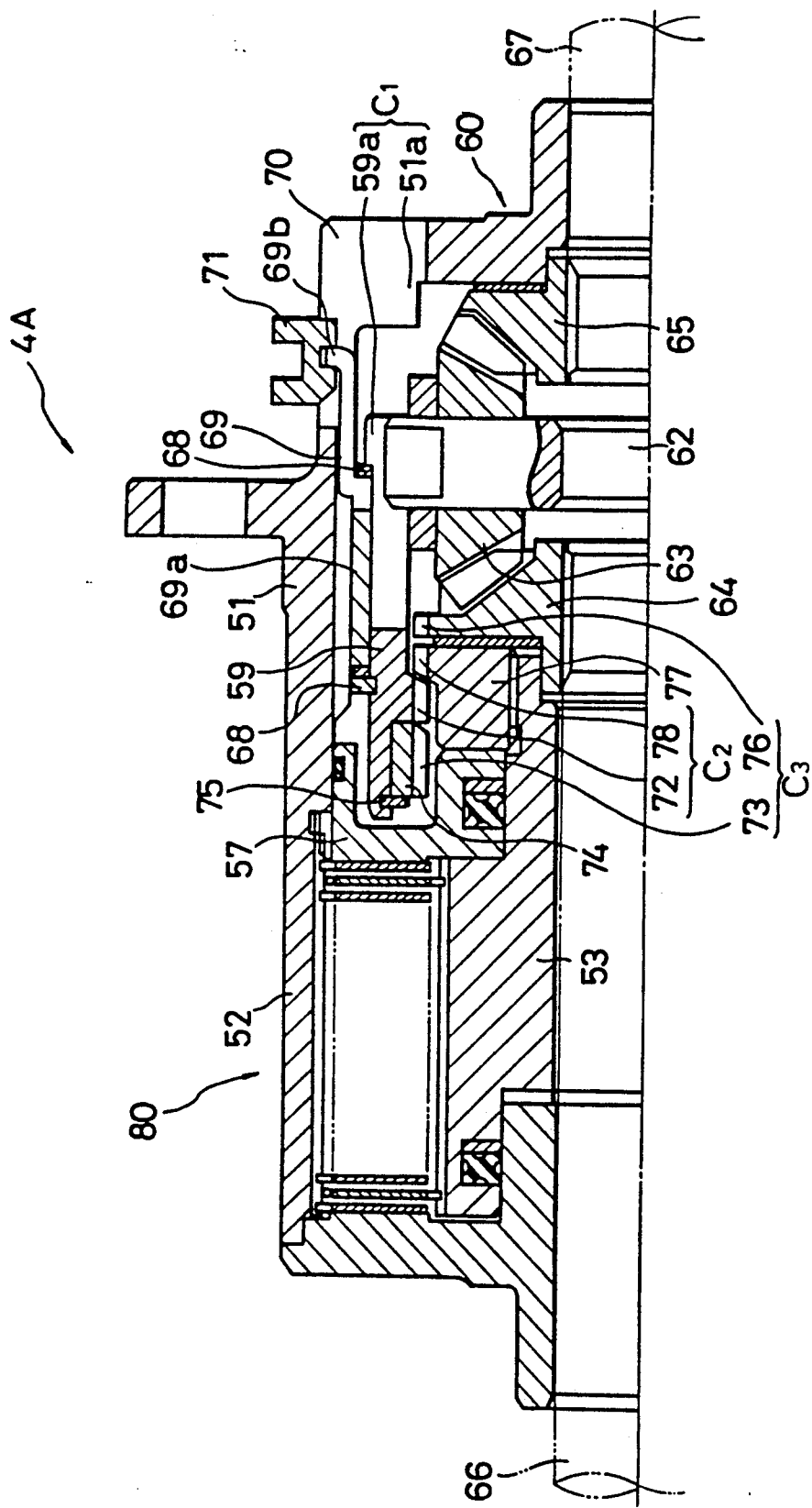
FIG. 3 is a cross-sectional view showing a second embodiment of the power transmission apparatus.

FIG. 3 shows a second embodiment of the power transmission apparatus (four wheel drive apparatus) according to the present invention. In FIG. 3 a viscous coupling 80 is composed of a first rotatable member 52 formed integral with an outer case 51, and a second rotatable member 53. The front wheel side differential gear 60 is made up of a differential case 59, a pinion shaft 62 fitted to a fitting groove 59a formed in the differential case 59, pinion gears 63 rotatably supported by the pinion shaft 62, and two side gears 64 and 65 in mesh with the pinion gears 63. The side gears 64 and 65 are connected via splines to the left side front wheel drive shaft 66 and the right side front wheel drive shaft 67, respectively.

Here, the differential case 59 is slidable relative to the pinion shaft 62. A movable member 69 is mounted on the differential case 59 via an engage member 68. This movable member 69 is composed of a cylindrical portion 69a located on the outer circumference of the differential case 59 and an engage piece 69b extending from the cylindrical portion 69a toward the right side in FIG. 3. This engage piece 69b is fitted to an engage groove 70 formed in the outer case 51 and extending in the axial direction of the right side wheel drive shaft 67.

An end of the engage piece 69b is engaged with a slidable operating member 71 slidably provided in the outer circumferential wall of the outer case 51.

When the operating member 71 is slid rightward, since the differential case 59 is slid rightward via the movable member 69, a projection portion 51a formed in the outer case 51 is engaged with this engage groove 59a, so that the outer case 51 is connected to the differential case 59. A gear 72 is formed on the inner circumference and the left side (in FIG. 3) of the differential case 59. On the left side of this gear 72, a roughly annular idling member 74 formed with a gear 73 on the inner circumference thereof is located by use of an engage member 75. A gear 76 engageable with the gear 73 of the idling member 74 is formed in the side gear 64. Between the side gear 64 and a second end wall member 57, a roughly annular driving member 77 is disposed so as to be spline coupled to the second rotatable member 53. A gear 78 is formed on the outer circumference of a drive member 77. This gear 78 is engageable with a gear 72 of the differential case 59 or the gear 73 of the idling member 74.

Here, when the slidable operating member 71 is slid rightward, since the differential case 59 is slid rightward simultaneously, the gear 72 of the differential case 59 is engaged with a gear 78 of the drive member 77. In contrast, when slid leftward, the gear 72 is disengaged from the gear 78. Therefore, the two gears 72 and 78 constitute a second clutch $C_2$ for connecting and disconnecting the differential case 59 to and from the second rotatable member 53.

Further, when the slidable operating member 71 is further slid rightward from a position where the two gears 72 and 78 are engaged with each other, since the differential case 59 is slid rightward simultaneously, the gear 72 is not engaged with the gear 78; the gear 72 is not engaged with the gear 78; the gear 73 of the idling member 74 is engaged with the gear 78 of the drive member 77 and the gear 76 of the side gear 64; and the projection portion 51a of the outer case 51 is engaged with the engage groove 59a of the differential case 59. In contrast, when slid leftward conversely, the gear 73 is disengaged from the gears 78 and 76, and the projection portion 51a is disengaged from the engage groove 59a. Therefore, the gears 73, 78 and 76 constitute a third clutch $C_3$ for connecting and disconnecting the second rotatable member 53 to and from the side gear 64, and further the engage groove 59a and the engage portion 51a constitute a first clutch $C_1$ for connecting and disconnecting the outer case 51 to and from the differential case 59.

When the slidable operating member 71 is further greatly slid leftward in FIG. 3, the first, second, and third clutches $C_1$, $C_2$ and $C_3$ are all disengaged. Under these conditions, an engine power is transmitted from the transfer to only the rear wheels via the rear wheel side differential gear to drive the vehicle in the ordinary two rear wheel drive mode. Under these conditions, the front wheels are rotated by the moving vehicle when the rear wheels are driven, and therefore the differential case 59 of the front wheel side differential gear 60 is rotated. However, since all the clutches $C_1$, $C_2$ and $C_3$ are disengaged, power will not be transmitted to the first rotatable member 52 of the viscous coupling 80; that is, the viscous coupling 80 is not rotated by the moving vehicle driven in two rear wheel drive mode, thus reducing travelling resistance, fuel consumption rate and vibration.

Figure 4:
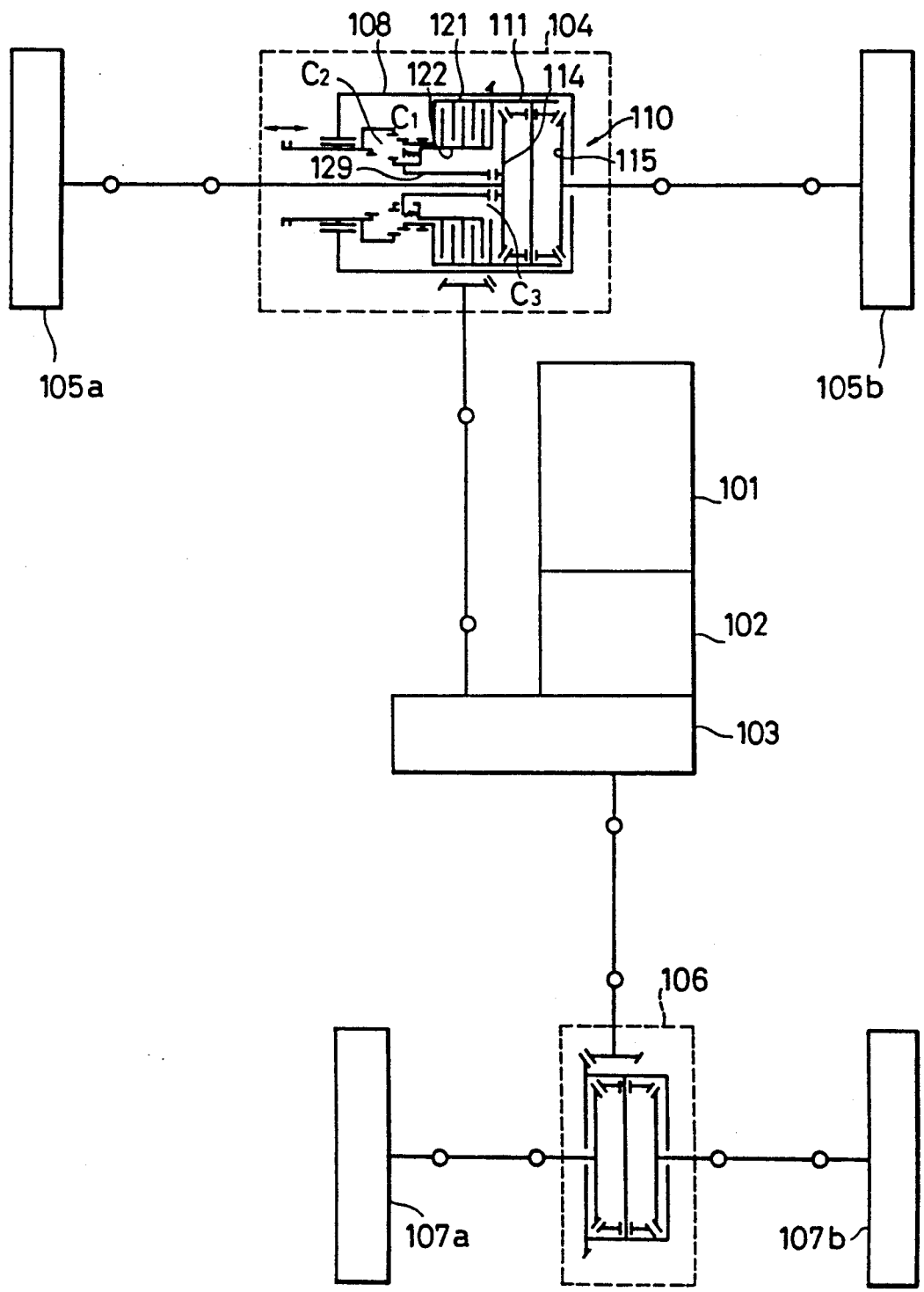
FIG. 4 is a skeletal view showing an automotive vehicle driving system to which a third embodiment of the power transmission apparatus according to the present invention is applied.
Figure 5:
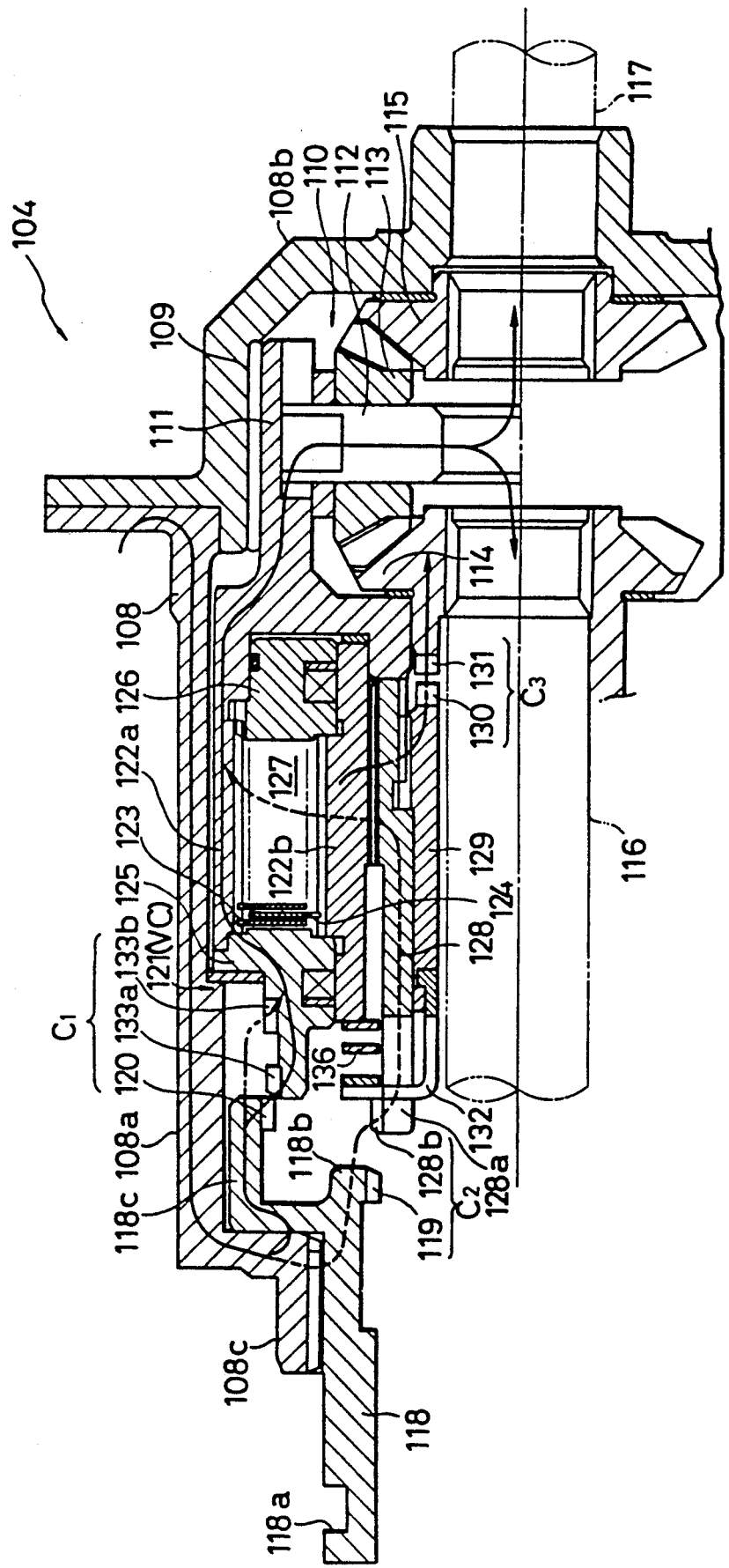
FIG. 5 is a cross-sectional view showing the third embodiment of the power transmission apparatus.

FIGS. 4 and 5 show a third embodiment of the power transmission apparatus according to the present invention. In FIG. 4, a drive power of an engine 101 is transmitted to the front wheels 105a and 105b via a transmission 102, a transfer 103 and the power transmission apparatus 104, and further to the rear wheels 107a and 107b via the transfer 103 and a rear wheel side differential gear 106.

FIG. 5 shows this power transmission apparatus 104. An engine power is transmitted from the engine 101 to an outer case (i.e. transmission member) 108. The outer case 108 is made up of a first cylindrical case 108a and a second roughly cup-shaped case 108b (on the right side in FIG. 5). A front wheel side differential gear 110 is rotatably supported by the second case 108b via a bearing 109. The front wheel side differential gear 110 is composed of a differential case 111, pinion gears 113 rotatably supported by the differential case 111 via a pinion shaft 112, and two side gears 114 and 115 engaged with the pinion gear 113. These side gears 114 and 115 are spline coupled to a front left wheel drive shaft 116 and a front right wheel drive shaft 117, respectively.

On the other hand, an end of the first case 108a is fixed to the second case 108b. The first case 108a is formed with a cylindrical portion 108c (on the left side in FIG. 5) whose diameter is smaller than that of the first case 108a on the other end thereof. A cylindrical slidable member 118 is disposed within the cylindrical portion 108c, and spline coupled with the cylindrical portion 108c. The slidable member 118 is formed with an engage groove 118a on the leftmost end in FIG. 5. A fork (not shown) shifted by a shift mechanism is engaged with this engage groove 118a. The slidable member 118 is formed with a small diameter portion 118a and a large diameter portion 118c on the right end side in FIG. 5. The small and large diameter portions 118b and 118c of the slidable member 118 are formed with gears 119 and 120, respectively on the inner circumference thereof.

A viscous coupling 121 is disposed between the slidable member 118 and the differential gear 110. That is, the differential case 111 of the differential gear 110 is formed with a first cylindrical rotatable member 122a, and a second cylindrical rotatable member 122b is disposed within the first rotatable member 122a. The first rotatable member 122a is formed with splines on the inner circumferential wall, with which first annular resistance plates 123 are engaged. The second rotatable member 122b is formed with splines on the outer circumferential wall, with which second annular resistance plates 124 are engaged. A first end wall member 125 and a second end wall member 126 are disposed on both the ends of the first rotatable member 122a and the second rotatable member 122b. The first end wall member 125 is fixed to an end of the first rotatable member 122a. The second end wall member 126 is spline engaged with the first rotatable member 122a. The first end wall member 125, the second end wall member 126 form a working chamber 127 filled with a viscous fluid such as silicon oil.

A first cylindrical drive member 128 is disposed within the second rotatable member 122b, and spline engaged with the second rotatable member 122b. The first drive member 128 is formed with a slit 128a on the slidable member (118) side and with a gear 128b engageable with a gear 119 of the drive member 118. A second cylindrical rotatable member 129 spline engaged with the first drive member 128 is disposed within the first drive member 128. The second drive member 129 is opposed to the side gear 114 of the differential gear 110, and a dog clutch gears 130 and 131 are formed on both the opposing sides thereof. Further, an engage member 132 is disposed so as to be engaged with a slit 128a of the first drive member 128 and with the second drive member 129, being urged toward the slidable member 118 by a compression spring 136.

On the other hand, the first end wall member 125 is formed with two gears 133a and 133b engageable with the gear 120 of the slidable member 118 at an axial interval along the left wheel drive shaft 116 and in parallel to each other.

Here, when the slidable member 118 is slid rightward in FIG. 5, this gear 120 is engaged with the gears 133a and 133b of the first end wall member 125. In contrast, when slid leftward, the gear 120 is disengaged from the gears 133a and 133b. Therefore, the gear 120 and the gears 133a, 133b constitute a first clutch $C_1$ for engaging and disengaging the outer case 118 with and from the first rotatable member 122a.

Further, when the slidable member 118 is slid rightward, the gear 119 is engaged with the gear 128b. In contrast, when slid leftward, the gear 119 is disengaged from the gear 128b. Therefore, the gear 119 and the gear 128b constitute a second clutch $C_2$ for connecting and disconnecting the outer case 108 with and form the second rotatable member 122b.

Further, when the slidable member 118 is slid rightward, although the gear 120 is engaged with the gear 133b, the small diameter portion 118b slides the second drive member 129 against an elastic force of the compression spring 136 to engage the gear 130 with the gear 131. In contrast, when the slidable member 118 is slid leftward, the gear 130 is disengaged from the gear 131 by the elastic force of the compression spring 136. Therefore, the gear 130 and the gear 131 constitute a third clutch $C_3$ for connecting and disconnecting the side gear 114 to and from the second rotatable member 122b.

The operation will be described hereinbelow when the first, second and third clutches $C_1$, $C_2$ and $C_3$ are engaged or disengaged, a drive power from the engine 101 can be transmitted via different transmission routes, so that various drive conditions can be selected.

When the first slidable member 118 is slid toward the right side (in FIG. 5) via the fork coupled to the shift mechanism, the gear 120 of the slidable member 118 is engaged with the gear 133a of the first end wall member 125. That is, the first clutch $C_1$ is engaged so that the differential case 108 and the first rotatable member 122a rotate together. Under these first clutch ($C_1$) engagement conditions, power is transmitted from the engine 101, via the transmission 102 and the transfer 103, to the outer case 108. The power transmitted to the outer case 108 is further transmitted to the first end wall member 125 and the first rotatable member 122a via the slidable member 118. The power transmitted to the first rotatable member 122a is simultaneously transmitted to the differential case 111 and differentially transmitted to the left side wheel drive shaft 116 and the right side wheel drive shaft 117 via the pinion gears 113, the side gears 114 and 115 as shown by thick solid line in FIG. 5. Under these conditions, although power is transmitted to the first rotatable member 122a, since the second rotatable member 122b and the first and second drive members 128 and 129 rotate together with the first rotatable member 122a, the viscous coupling 121 is disabled. Therefore, an engine power is transmitted to the front wheels 105a and 105b and the rear wheels 107a and 107b, respectively, via the transmission 102, the transfer 103, the front wheel side differential gear 110, and the rear wheel side differential gear 106.

When the slidable member 118 is slid further toward the right side (in FIG. 5), the gear 120 of the slidable member 118 is located between the gears 133a and 133b of the first end wall member 125, and further the gear 119 of the slidable member 118 is engaged with the gear 128b of the first drive member 128. That is, the second clutch $C_2$ is engaged, so that the outer case 108 is connected to the second rotatable member 122b. Once the second clutch $C_2$ is engaged, power transmitted to the outer case 108 is transmitted to the second rotatable member 122b via the slidable member 118. Further, the power is transmitted to the front wheels 105a and 105b via the viscous coupling 121 and the differential gear 110 as shown by thick dashed line in FIG. 5. Therefore, a differential operation is effected between the front wheels 105a and 105b and the rear wheels 107a and 107b, so that it is possible to prevent the occurrence of tight corner braking phenomenon. In addition, since the viscous coupling 121 is operative, even if any one of the front and rear wheels 105a and 105b, and 107a and 107b is being idled, it is possible to transmit power to the other wheels not being idled.

When the slidable member 118 is slid further toward the right side, the gear 120 of the slidable member 118 is engaged with the gear 133b of the first end wall member 125, and the gear 119 of the slidable member 118 is disengaged from the gear 128b of the first drive member 128, so that the second drive member 129 is urged to engage the gear 130 with the gear 131 of the side gear 114. That is, since the first clutch $C_1$ and the third clutch $C_3$ are engaged, the outer case 108 is connected to the first rotatable member 122a, and the second rotatable member 122b is connected to the side gear 114. Once the first and third clutches $C_1$ and $C_3$ are engaged, a power transmitted to the outer case 108 is transmitted to the front wheels 105a and 105b via the first rotatable member 122a and the differential gear 110 as shown by thick dot-dashed line in FIG. 5.

When there exists a difference in rotative speed between the left side wheel drive shaft 116 and the right side wheel drive shaft 117 during an automotive vehicle travelling on a muddy road, the relative rotation between the first rotatable member 122a and the second rotatable member 122b is limited by viscous resistance of the viscous coupling, so that the differential operation between the right and the left side wheel drive shafts 116 and 117 is limited to improve the travelling performance on a muddy road.

When the slidable member 118 is slid leftward conversely, the first, second and third clutches $C_1$, $C_2$, $C_3$ are all disengaged. Under these conditions, an engine power is transmitted from the transfer 103 to only the rear wheels 107a and 107b via the rear wheel side differential gear 106, so that the vehicle is driven in the ordinary two rear wheel drive mode.

As described above, since the first, second and third clutches $C_1$, $C_2$ and $C_3$ are disposed so as to oppose the slidable member 118, when the slidable member 118 is slid, it is possible to engage or disengage the three clutches $C_1$, $C_2$ and $C_3$, thus providing an appropriate driving mode according to road surface conditions and travelling conditions. Therefore, it is possible to simplify the control system for providing an optimum drive mode. As a result, it is possible to reduce the apparatus cost and trouble occurrence. The above embodiment has been explained of the case where the apparatus of the present invention is applied to the front wheel side differential gear for a 4WD vehicle. Without being limited thereto, however, it is possible to apply the apparatus of the present invention to the rear wheel side differential apparatus or vehicles of other different types.

A fourth embodiment of the present invention will be described with reference to FIGS. 6 and 7.

Figure 6:
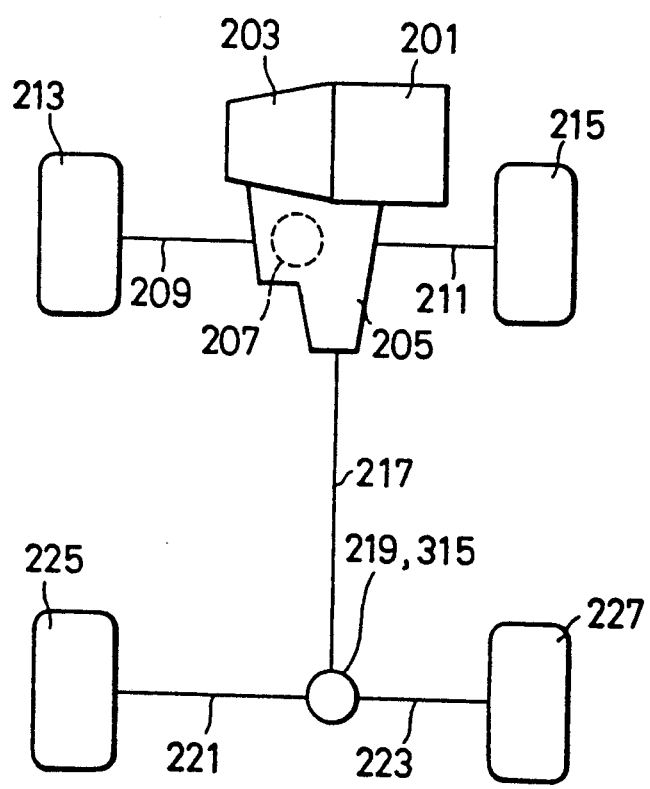
FIG. 6 is a diagrammatical illustration showing an automotive vehicle driving system to which fourth and fifth embodiments of the power transmission apparatus according to the present invention are applied.

FIG. 6 shows an FF (front engine front drive) 4WD (four wheel drive) vehicle in which a power transmission apparatus of the present invention is used as a rear differential gear. Further, in FIG. 7, the upper half indicates a state where the clutch device is engaged and the lower half indicates a state where the clutch device is disengaged. Further, in FIG. 7, the horizontal direction corresponds to the vehicle lateral direction.

The power transmission route will be described with reference to FIG. 6. A drive power of an engine 201 is speed changed via a transmission 203, transmitted to a differential case of a front wheel side differential gear 207 housed in a transfer 205, and then directly distributed differentially to right and left front wheels 213 and 215 via two front wheel shafts 209 and 211. On the other hand, an engine power is transmitted to the fourth embodiment of the power transmission apparatus 219 via the differential case, a 2-4 switching mechanism housed in the transfer 205 to connect and disconnect power to and from the rear wheels and a change-direction gear assembly (both not shown). The rear differential gear of the power transmission apparatus 219 distributes a transmitted power differentially to right and left rear wheels 225 and 227 via two rear wheel shafts 221 and 223.

The embodiment will be described with reference to FIG. 7. An outer case (housing) 229 is composed of a case (housing) body 231 and its cover 233, and rotatably supported by a differential carrier (not shown) for housing a rear differential gear via a bearing (not shown). The case body 231 is formed with a flange portion 235 having bolt holes 237 to which a ring gear is fastened by bolts. The ring gear is engaged with a drive pinion connected to the propeller shaft 217, and constitutes a final reduction gear assembly together with a drive pinion. As described above, the outer case (housing) 229 is driven by a drive power from the engine 201.

Within the outer case 229, a cover 233 is formed with a shaft support portion 239 for rotatably support an inner hub portion 241. A working chamber 243 is formed between the inner hub 241 and the case body 231 and filled with a viscous fluid such as silicon oil. Within the working chamber 243, the case body 231 is formed with splines 245 to which plural outer plates 249 are engaged, and the inner hub 241 is formed with splines 247 to which plural inner plates 251 are engaged. These plates 249 and 251 are arranged alternately, and a spacer 253 is disposed between two outer plates 249 to keep the gap between the two appropriately. Further, a ring 255 is disposed on the right end of the working chamber 243, whose outer splines 257 are engaged with splines 245 of the case body 231. An X-shaped cross-section rubber seal 259 is disposed between the ring 255 and the inner hub 241; an O-ring rubber seal 261 is disposed between the ring 255 and the case body 231; and an X-shaped cross-section rubber seal 263 is disposed between the cover 233 and the inner hub 241 and at the shaft support portion 239, so that the working chamber is kept watertightly to constitute a viscous coupling 265.

Within the outer case (housing) 229, a differential case 267 is disposed on the right side of the viscous coupling 265, and rotatably supported by the case body 231 via a bush 269. Four axial grooves 271 are formed on the inner circumference of the differential case 267. A cross-shaped pinion shaft 273 is engaged with these grooves 271. Therefore, the differential case 267 is rotatable together with the pinion shaft 273 and slidable relative to the pinion shaft 273. Four pinion gears 275 are rotatably supported by the pinion shaft 273. On both the sides of the pinion gears 275, two side gears 277 and 279 are disposed coaxially and engaged with the pinion gears 275. A washer 281 is disposed between the differential case 267 and the pinion gears 275; a washer 283 is disposed between the inner hub 241 and the left side gear 277; and a washer 285 is disposed between the case body 231 and the right side gear 279, respectively to constitute a rear differential gear 287. The left side gear 277 is spline engaged with a transmission shaft (not shown) ,connected to the rear wheel shaft 221 via a joint (not shown), and the right side gear 279 is spline engaged with a transmission shaft (not shown) connected to the rear wheel shaft 223 via a joint (not shown).

The inner hub 241 is formed with splines 289 on the right outer circumference thereof, and the differential case 267 is formed with splines 291 engaged with the splines 289 on the left inner circumference thereof. A retainer 293 is disposed on the right end side of the differential case 267, and a retainer 295 is disposed on the side of the washer 281. The case body 231 is formed with several windows 297 at regular angular intervals and with a small diameter portion on the right outer circumference thereof. A slide ring 299 is axially slidably fitted to this small diameter portion. The slide ring 299 is formed with plural arms 301 passed through the openings 297 into contact with the retainer 293 via a needle bearing 303. A return spring 305 is disposed between the retainer 293 and the retainer 295 to urge the differential case 267 rightward. Further, a bifurcated fork 307 is slidably engaged with the outer circumference of the slide ring 299. The slide ring 299 is formed with a projection portion 309 for stopping the fork 307 on the left side thereof. Therefore, when the fork 307 is moved leftward against an elastic force of a return spring 305, the differential case 267 is moved leftward via the slide ring 299. A stepped portion 311 formed between the small and large diameter portions of the case body 231 serves as a stopper for prevention of contact between the leftward moved differential case 267 and the ring 255. A clutch device 313 is thus constructed.

When the fork 307 is moved against the return spring 305 of the clutch device 313, the differential case 267 is reciprocably moved between the lefthand engage position and the righthand disengage position. That is, when moved to the engage position, the differential case 267 is engaged with the inner hub member 241 via the splines 289 and 291. Further, when moved to the disengage position, the differential case 267 is disengaged from the inner hub member 241. The above-mentioned operation can be made manually by the driver or automatically according to the steering angle, the speed, the braking or the operation of a 2-4WD switching mechanism.

The operation of this fourth embodiment will be described hereinbelow.

Figure 7:
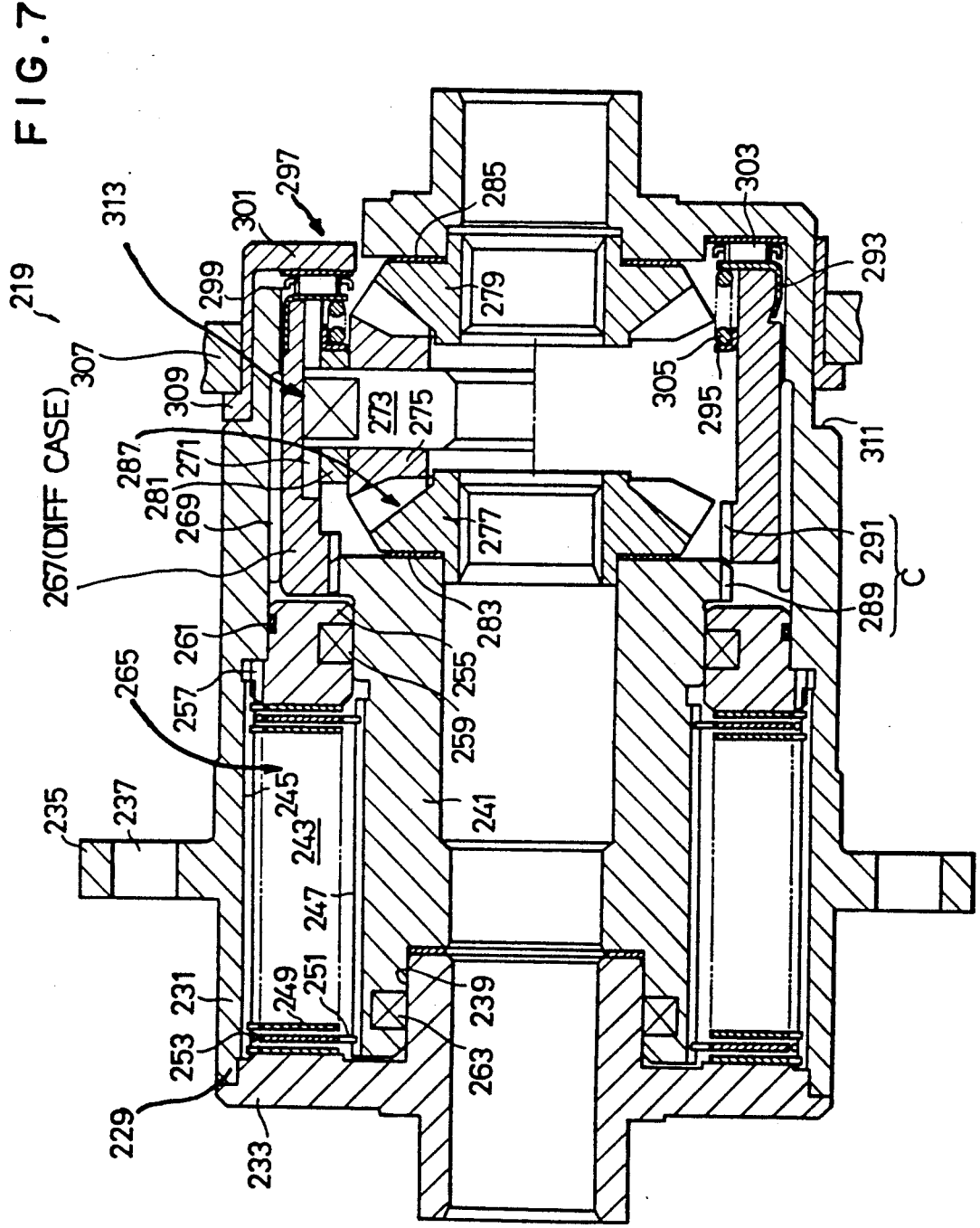
FIG. 7 is a cross-sectional view showing the fourth embodiment of the power transmission apparatus.

When the clutch device 313 is shifted to the engage position as shown by the upper part in FIG. 7, an engine power is transmitted to the differential gear 287 via the viscous coupling 265. Under these conditions, when there exists a large difference in rotative speed between the outer case (housing) 229 of the viscous coupling 265 and the inner hub 241 due to unbalance between engine drive power and load of the rear wheels 225 and 227, the differential rotation is largely restricted owing to the characteristics of the viscous coupling 265, so that a large drive power is transmitted to the rear wheels 225 and 227. Further, when the rotational difference is small, a large differential revolution is obtained, and a small torque is transmitted to the rear wheels 225 and 227.

When the clutch device 313 is shifted to the disengage position as shown by the lower part in FIG. 7, power transmission is interrupted between the viscous coupling 265 and the rear differential gear 287, so that the rear wheels 225 and 227 rotate free.

The function of the fourth embodiment will be explained in relation to a vehicle shown in FIG. 6.

When the clutch device 313 is engaged, the vehicle is driven in full-time 4WD mode. In more detail, when difference in rotative speed between the front wheels 213, 215 and the rear wheels 225 and 227 is small in the ordinary travelling state, since the transmission torque via the viscous coupling 265 is small, the vehicle travels in such a power distribution state as in FF-base 2WD mode. However, if the load of the rear wheels 225 and 227 increases as when the front wheels 213 and 215 slip, since a large drive power is distributed also to the rear wheels 225 and 227, the vehicle can travel smoothly.

Further, when the vehicle is turned sharply at a low speed as when put into a garage, since difference in rotative speed between the front and rear wheels is small, this rotative difference can be absorbed by the viscous coupling 265, so that the propeller shaft 217 is not twisted without producing tight corner braking phenomenon. Further, since the front wheels 213 and 215 are driven directly and the rear wheels 225 and 227 are driven via the viscous coupling 265, when the difference in rotative speed between the front and rear wheels is large, it is possible to improve the vehicle safety, steering stability, and travelling performance on muddy roads.

When the clutch device 313 is disengaged, the vehicle is switched to a perfect 2WD state, so that the vehicle can travel in a mode equivalent to an FF mode.

In the 2WD mode, when the 2-4WD switching mechanism of the transfer 205 is switched to 2WD mode side, the change-direction gear assembly of the rear wheels 225 and 227 and the propeller shaft 217 stop rotating. Therefore, it is possible to reduce abrasion, noise, vibration, fuel consumption rate, etc. due to wasteful revolutions of these elements; that is, it is possible to obtain the same effect as free hub clutch.

As described above, since the power transmission apparatus 219 according to the present invention is not disposed on the propeller shaft 217, it is possible to reduce the inertial moment of the propeller shaft 217 and to prevent vibration due to eccentricity. Further, since the propeller shaft 217 is not divided, it is unnecessary to provide an apparatus supporting device midway on the propeller shaft 217.

Further, since the viscous coupling 265 and the rear differential gear 287 are disposed along the axial direction and further the diameter of the inner hub member 241 is determined smaller than that of the differential case 267, it is possible to reduce the diameter of the power transmission apparatus 219. Therefore, there exists such an advantage that it is possible to increase the height between the vehicle bottom and the ground when the apparatus of the present invention is applied to automotive vehicles. Further, since the diameter of the viscous coupling 265 is reduced and therefore the relative rotative speed between the input and output members of the viscous coupling 265 can be reduced, it is possible to improve the durability of the X-rings 259 and 263.

Figure 8:
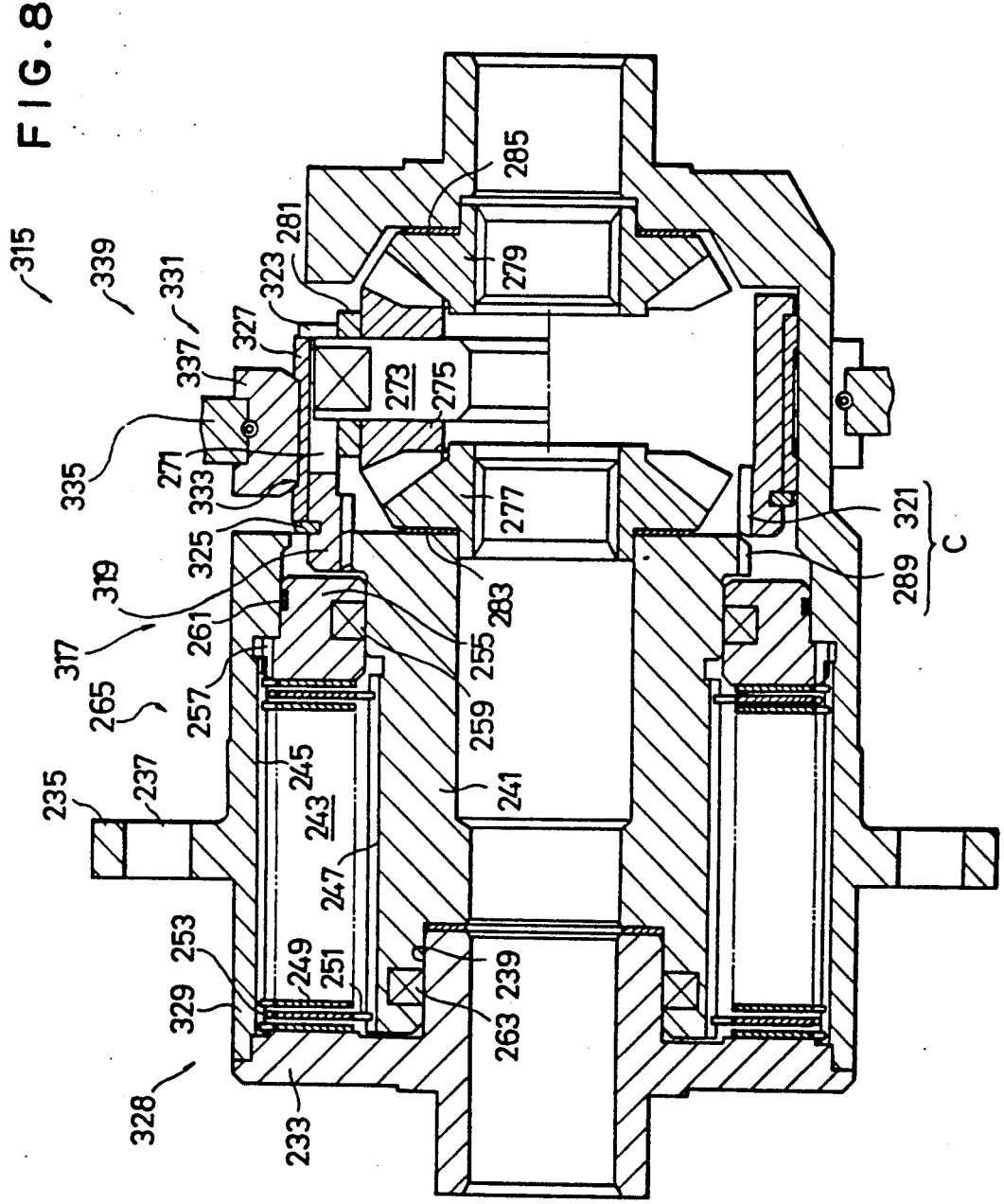
FIG. 8 is a cross-sectional view showing the fifth embodiment of the power transmission apparatus.

FIG. 8 shows a fifth embodiment of the power transmission apparatus 315. This apparatus 315 is mounted on the vehicle as shown in FIG. 6 in the same way as in the fourth embodiment.

In FIG. 8, the upper part shows a clutch engage state, and the lower part shows a clutch disengage state. The same reference numerals have been retained for similar parts which have the same functions as in the fourth embodiment, and only the difference between the two embodiments will be described hereinbelow.

A rear differential gear 317 is disposed on the right side of the viscous coupling 265. A differential case 319 is formed with splines 321 engaged with splines 289 of the inner hub member 241, on the lefthand inner circumference thereof. Further, the differential case 319 is formed with a projection portion 323 on the right outer circumference thereof. A stopper ring 325 is fixed on the left side of the differential case 319. A bush 327 is slidably disposed between the projection portion 323 and the stopper ring 325. The differential case 319 is rotatably engaged with a case body 329 constituting the outer case 328 together with the cover 233 via this bush 327. In the same way as in the fourth embodiment, an end of the pinion shaft 273 is engaged with the groove 271 formed in the inner circumference of the differential case 319. Therefore, the differential case 319 is rotatable together with the pinion shaft 273, and axially movable relative to the pinion shaft 273 and the case body 329.

The case body 329 is formed with plural windows 331 at regular angular intervals, and the bush 327 is formed with an outer circumferential groove 333. An end of a bifurcated fork 335 is engaged with a sleeve 337 passing through the windows 331 into engagement with the outer circumferential groove 333 of the bush 327. A clutch device 339 is thus constructed.

When the clutch device 339 is operated and the fork 335 is moved leftward into an engage position as shown by the upper part in FIG. 8, the differential case 319 is engaged with the inner hub member 241 via the splines 289 and 321, so that engine power is transmitted to the rear differential gear 317 via the viscous coupling 265. Further, when the fork 335 is moved rightward into a disengage position as shown by the lower part in FIG. 8, the differential case 319 is disengaged from the inner hub member 241, so that engine power is not transmitted to the rear differential gear 317. The clutch device 339 is operated in the right and left direction manually or automatically in the same way as in the fourth embodiment. The function and effect other than the above are the same as in the fourth embodiment.

A sixth embodiment of the present invention will be described with reference to FIGS. 9 and 10.

Figure 9:
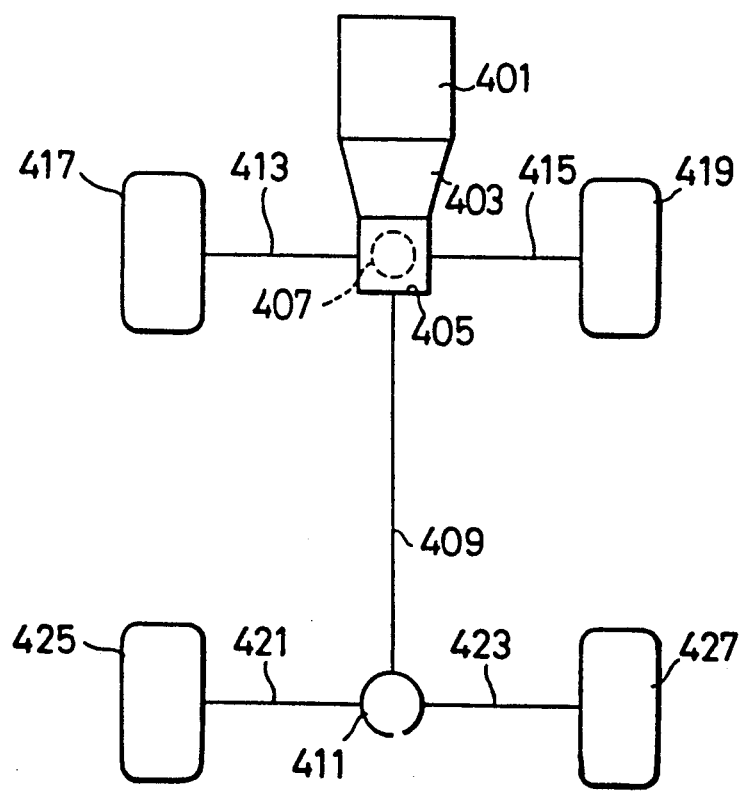
FIG. 9 is a diagrammatical illustration showing an automotive vehicle driving system to which a sixth embodiment of the power transmission apparatus according to the present invention is applied.

FIG. 9 shows a 4WD (four wheel drive) vehicle in which a power transmission apparatus of the present invention is used as a rear wheel drive system. Further, in FIG. 10(a), the upper half indicates a state where the clutch device is engaged and the lower half indicates a state where the clutch device is disengaged. Further, in FIG. 10(a), the horizontal direction corresponds to the vehicle lateral direction, and the upper direction corresponds to the vehicle front shown in FIG. 9.

The power transmission route will be described with reference to FIG. 9. A drive power of an engine 401 is speed changed via a transmission 403, and transmitted to a transfer 405. The power transmitted to the transfer 405 is transmitted to a front differential gear 407, and to the viscous coupling of the power transmission apparatus 411 according to the present invention via a change-direction gear assembly and a built-in 2-4WD switching mechanism (both not shown) and a propeller shaft 409. Engine power transmitted to the front differential gear 407 is distributed differentially to the left and right front wheels 407 and 419 via front wheel shafts 413 and 415. The power transmission apparatus 411 transmits power from the viscous coupling to the rear differential gear which distributes differentially power to the rear left and right wheels 425 and 427 via two rear wheel shafts 421 and 423. Further, the 2-4WD switching mechanism is a mechanism for interrupting power from the rear wheels 425 and 427.

The embodiment will be described with reference to FIGS. 10(a) and 10(b). A housing 429 is composed of a housing body 431 and its cover 433 temporarily fixed by screws 435, and rotatably supported by a differential carrier (not shown) for housing the power transmission apparatus 411 via a bearing (not shown). The housing 429 is formed with a flange portion 437 having a bolt hole 439 to which a ring gear is fastened by screws. The ring gear (not shown) is engaged with a drive pinion connected to the propeller shaft 409, and constitutes a final reduction gear assembly together with a drive pinion. As described above, the housing 429 is driven by a drive power from the engine 401.

Within the housing 429, a housing body 431 is formed with a shaft support portion 441 for rotatably support an inner hub member 443. An annular working chamber 445 is formed between the hub member 443 and the housing body 431. The housing 429 is formed with through holes 447 and 449 for communications between the inside and the outside of the working chamber 445. A high viscous silicon oil (viscous fluid) is charged into the working chamber 445 through one hole while relieving air through the other hole. After oil has been charged, the through holes 447 and 449 are closed by pressure fitting steel balls 451 and 453 into the holes 447 and 449.

Within the working chamber 445, the housing body 431 is formed with splines 455 to which plural outer plates 459 are engaged, and the hub member 443 is formed with splines 457 to which plural inner plates 461 are engaged. These plates 459 and 461 are arranged alternately, and a spacer 463 is disposed between two outer plates 459 to keep a gap between the two appropriately. Further, a ring 465 is disposed on the right end side of the working chamber 445, whose outer splines 467 are engaged with splines 455 of the housing body 431. An X-shaped cross-section rubber seal 469 and a backing ring 471 are disposed between the ring 465 and the inner hub member 443; an O-ring 473 is disposed between the ring 465 and the housing 429; and an X-ring 475 and a backing ring 477 are disposed between the housing 429 and the inner hub member 443 and at the shaft support portion 441. The ring 465 is formed with a stepped portion 479 so as to be brought into contact with a stepped portion 481 of the housing body 431 for prevention of removal from the housing 429. Further, a retainer 483 in contact with the right end of the ring 465 is mounted on the inner hub member 443 for prevention of the leftward movement of the housing 429. A viscous coupling 485 is thus constructed.

Within the housing 429, a clutch ring 487 (engage member) corresponding to a differential case is disposed on the right side of the viscous coupling 485, and rotatably and axially slidably supported by the housing 429 via needle bearings 488. Four axial grooves 489 are formed on the inner circumference of the clutch ring 487. A cross-shaped pinion shaft 491 is engaged with these grooves 489. Therefore, the clutch ring 487 is rotatable together with the pinion shaft 491 and slidable relative to the housing 429 and the pinion shaft 491. Four pinion gears 493 are rotatably supported by the pinion shaft 491. On both the sides of the pinion gears 493, two side gears 495 and 497 are disposed coaxially and engaged with the pinion gears 493. A spherical washer 499 is disposed between the clutch ring 487 and the pinion gear 493; a washer 501 is disposed between the cover 433 and the left side gear 495; and a washer 503 is disposed between the inner hub member 443 and the right side gear 497, respectively to constitute a rear differential gear 505. The left side gear 495 is spline engaged with a transmission shaft (not shown) connected to the rear wheel shaft 421 via a joint (not shown), and the right side gear 497 is spline engaged with a transmission shaft (not shown) connected to the rear wheel shaft 423 via a joint (not shown). These right and left transmission shafts are passed through the cover 433 of the housing 429 and the housing body 431. Oil grooves 507 and 509 are formed at the corresponding positions.

The inner hub member 443 is formed with splines 511 on the right side outer circumference thereof, and the clutch ring 487 is formed with splines 513 engaged with the splines 511 on the left side inner circumference thereof. A retainer 515 is disposed on the right end side of the clutch ring 487. One end 517 of the retainer 515 is fixed to the clutch ring 487 by bending it into an annular recess 519 formed on the outer circumference of the clutch ring 487. A return spring 521 (urging member) is disposed between the pinion shaft 491 (fitted into the groove 489 of the clutch ring 487) and the retainer 515 to urge the clutch ring 487 leftward via the retainer 515.

The cover 433 of the housing 429 is formed with plural windows 523 at regular angular intervals. Further, a slide ring 525 is axially movably fitted to the outer cylindrical circumference of the cover 433. The slide ring 525 is formed with plural arms 527 passed through the windows 523 into contact with the retainer 515 via a slide washer 529 and a needle bearing 531. Further, a fork (not shown) is slidably engaged with the outer circumference of the slide ring 525. The fork and these elements 525, 529, 531 and 515 constitute a shifting means.

When the clutch ring 487 is moved rightward against an elastic force of the return spring 521 by operating the fork, since the splines 511 are engaged with the splines 513, the inner hub member 443 is engaged with the clutch ring 487. In this case, when the arm 527 is moved rightward, since the right side surface 535 thereof is brought into contact with the left side surface of the window 523, it is possible to prevent the right end of the clutch ring 487 from being brought into contact with the left end of the housing body 431. When the fork is stopped, the clutch ring 487 is moved leftward by an elastic force of the return spring 521 as shown by the lower half part in FIG. 10(a) or by dashed lines in the upper half part thereof, so that the splines 511 are disengaged from the splines 513; that is, the inner hub member 443 is disengaged from the clutch ring 487.

The above-mentioned operation can be achieved manually by the driver or automatically according to the steering angle, the acceleration, the braking, etc.

The operation of this sixth embodiment will be described hereinbelow.

When the power transmission apparatus 411 is engaged as shown by the upper part in FIG. 10(a), an engine power is transmitted to the differential gear 505 via the viscous coupling 485. Under these conditions, when there exists a large difference in rotative speed between the housing 429 and the inner hub portion 443 due to unbalance between engine drive power applied to the housing 429 of the viscous coupling 485 and drive resistance of the rear wheels 425 and 427, the differential rotation is largely restricted owing to the sheering resistance of the silicon oil, so that a large drive power is transmitted to the rear wheels 425 and 427. Further, when the rotational difference is small, a large differential revolution is effected, and a small torque is transmitted to the rear wheels 428 and 427.

When the power transmission apparatus 411 is shifted to the disengage position as shown by the lower part in FIG. 10(a), power transmission is interrupted between the viscous coupling 485 and the rear differential gear 505, so that the rear wheels 425 and 427 rotate free.

The function of the sixth embodiment will be explained in relation to a vehicle drive system shown in FIG. 9.

When the apparatus 411 is engaged by operating the fork, the vehicle is driven in full-time 4WD mode. Under these conditions, since the front wheels 417 and 419 are driven directly and the rear wheels 425 and 427 are driven via the viscous coupling 485, it is possible to improve the vehicle safety, steering stability, and travelling performance on muddy roads.

When the vehicle travels on a paved road without large acceleration and braking, the difference in rotative speed between the front wheels 417, 419 and the rear wheels 425 and 427, that is, the difference in rotative speed between the input and output elements of the viscous coupling 485 is small. Therefore, since drive power transmitted to the rear wheels 425 and 427 is small, the vehicle travels in such a drive power distribution mode as FF (front engine and front drive) 2WD (two wheel drive) mode.

When the front wheels 417 and 419 slip, since the difference in rotative speed of the viscous coupling 485 increases, a large power is transmitted to the rear wheels 425 and 427, so that the vehicle can travel smoothly.

Further, when the vehicle is turned sharply at a low speed as when put into a garage, since difference in rotative speed between the front and rear wheels is small, this rotative difference can be absorbed by the viscous coupling 485, it is possible to effect smooth turning without producing tight corner braking phenomenon.

When the apparatus 411 is disengaged, the vehicle is switched to a perfect 2WD state, so that the vehicle can travel in a mode equivalent to an FF mode.

During the 2WD travelling, when the 2-4WD switching mechanism of the transfer 405 is switched to 2WD side, the propeller shaft 409, the final reduction gear of assembly, and the viscous coupling 485 which constitute the rear wheel drive system stop rotating.

Therefore, it is possible to reduce abrasion, noise, vibration, fuel consumption rate, etc. due to wasteful revolutions of these elements; that is, it is possible to obtain the same effect as free hub clutch.

The effect of the sixth embodiment will be described hereinbelow. Since the return spring 521 is disposed between the pinion shaft 491 and the retainer 515 and further located within the groove 489 of the clutch ring 487; that is, the return spring 521 is disposed between two rotating members (not between two relatively rotating members), it is possible to reduce abrasion and resistance due to sliding contact.

Further, since the return spring 521 is located within the groove 489, it is possible to reduce the winding diameter of the return spring 521, and therefore to use a large diameter wire for large elastic force. In addition, since four springs can be fitted to the four grooves 489, separately, it is possible to obtain a large elastic force as the whole, thus allowing a reliable engage/disengage operation. Further, the grooves 489 are used in common as fitting grooves, no additional space is required.

Further, since the viscous coupling 485 and the differential gear 505 are assembled together, it is possible to mount the power transmission apparatus 411 on the wheel shaft not on the propeller shaft, thus reducing an increase in the inertial moment of the propeller shaft 409 and therefore preventing vibration. Further, the propeller shaft 409 is not divided, and no propeller shaft supporting members are required.

Further, in this embodiment, since the viscous coupling 485 and the differential gear 505 are disposed along the axial direction thereof, the diameter of the inner hub member 443 is smaller than that of the clutch ring 487, thus reducing the diameter of the apparatus 411. Therefore, when used for a vehicle, there exists such an advantage that the height between the vehicle bottom and the ground can be increased. Further, since the diameter of the viscous coupling 485 is reduced, the relative rotative speed between the housing 429 and the inner hub member 443 can be reduced, and therefore it is possible to improve the life of the X-shaped rings 469 and 475.

Further, the retainer 483 can prevent the hub member 443 from being removed from the housing 429. Therefore, no fixing jig for holding the hub member 443 is required when the housing 429 is being machined before the differential gear 505 is assembled, thus reducing the chance of occurrence of crackes. Further, when the differential gear 505 is removed for maintenance, it is unnecessary to engage the hub member 443 and the inner plates 461 again. Further, in this embodiment, it is also possible to dispose the return spring 521 in such a way that the clutch ring 487 is urged rightward into an engage position. In this case, the clutch ring 487 is disengaged by moving the shifting means 533 in the opposite direction.

Figure 11:
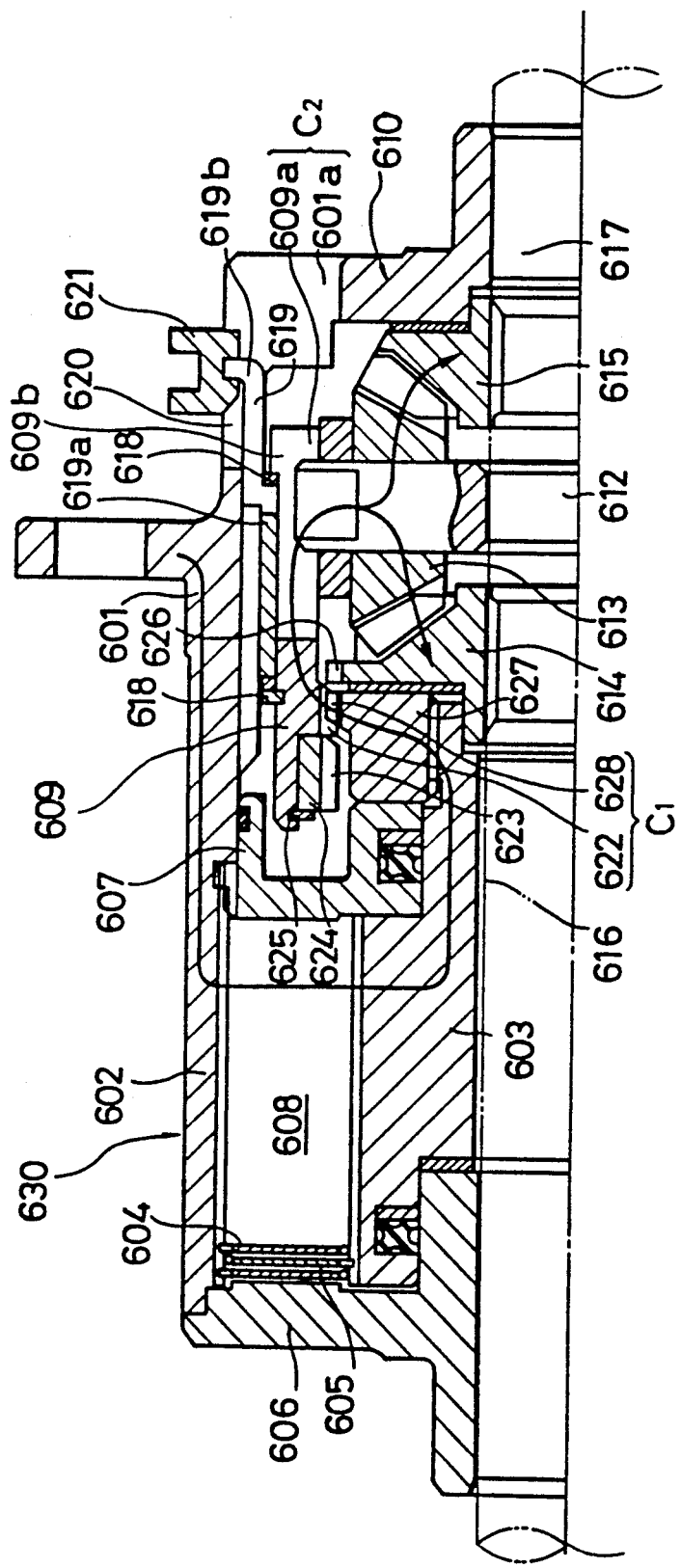
FIG. 11 is a half cross-sectional view showing a seventh embodiment of the power transmission apparatus according to the present invention, in which a first clutch $C_1$ is engaged.
Figure 12:
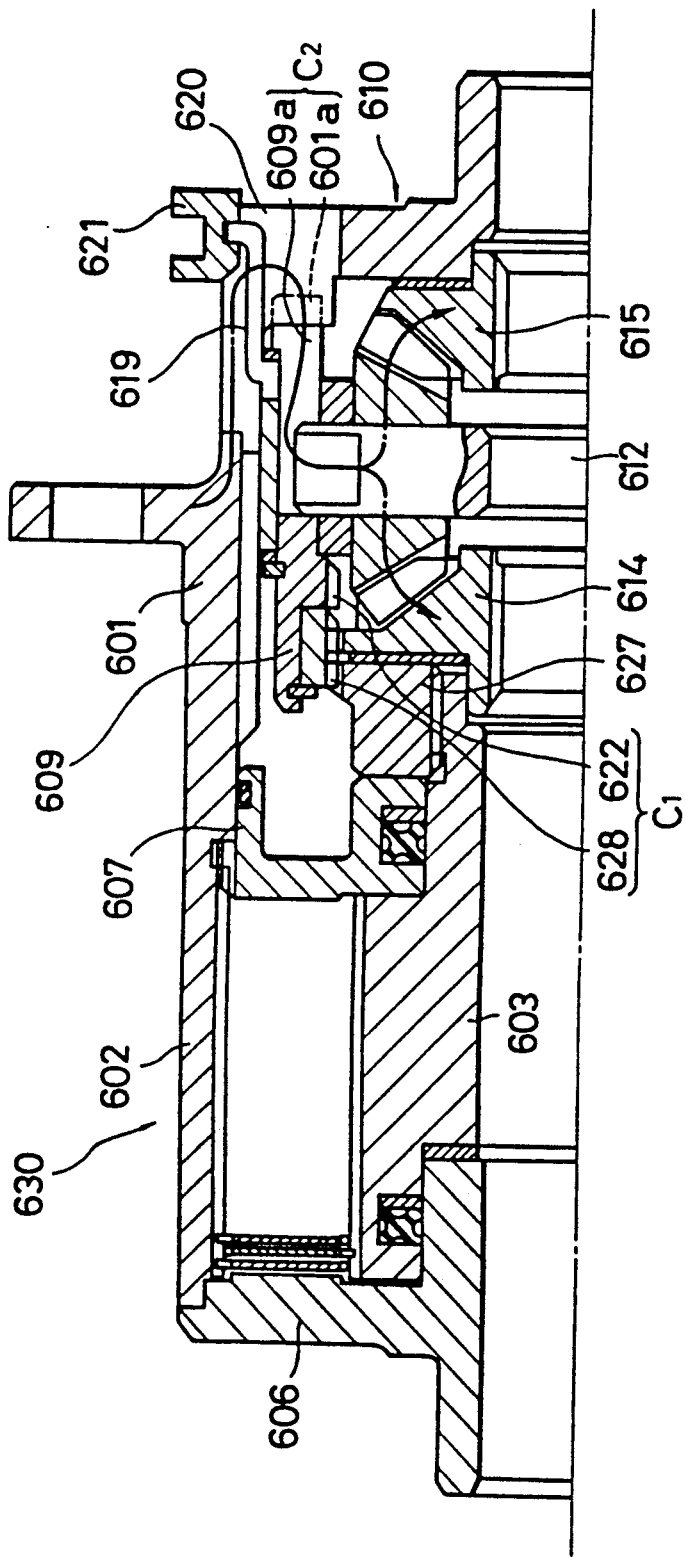
FIG. 12 is a half cross-sectional view showing the seventh embodiment, in which a second clutch $C_2$ is engaged.
Figure 13:
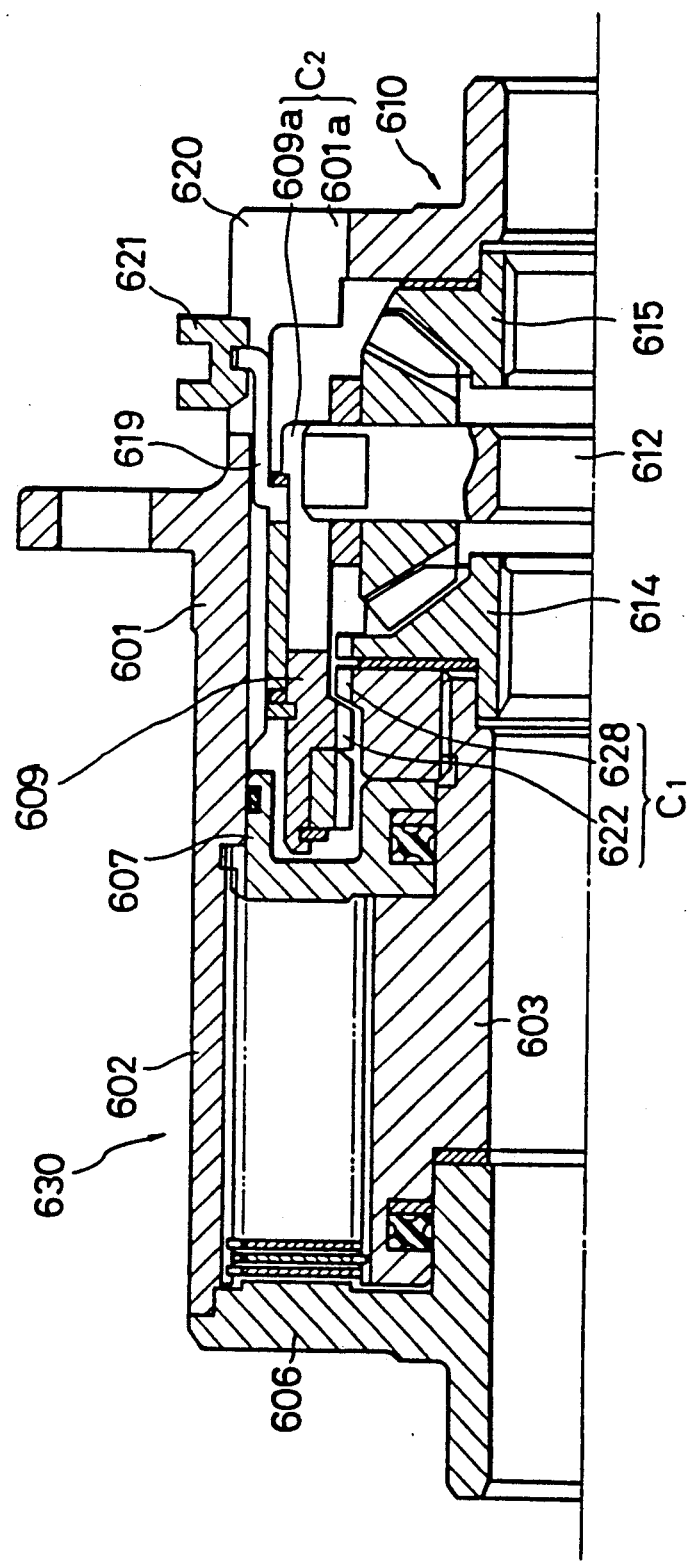
FIG. 13 is a half cross-sectional view showing the seventh embodiment, in which the first and second clutches $C_1$ and $C_2$ are both disengaged.

FIGS. 11, 12 and 13 show a seventh embodiment of the present invention.

A drive power from an internal combustion engine is transmitted to two front wheels via a transmission, a transfer, and the power transmission apparatus according to the present invention. In addition, the drive power is transmitted from the transfer to two rear wheels via a rear wheel side differential gear.

The power transmission apparatus will be described hereinbelow with reference to FIG. 11. A drive power from the engine is transmitted to a roughly cylindrical outer case (housing) 601. This outer case 601 is formed integral with a first cylindrical rotatable member 602 within which a second cylindrical rotatable member 603 is disposed. The inner circumferential wall of the first rotatable member 602 is formed with splines engaged with a plurality of first resistance plates 604. The outer circumferential wall of the second rotatable member 603 is also formed with splines engaged with a plurality of second resistance plate 605.

A first end wall member 606 and a second end wall member 607 are disposed on both the side ends of the two first and second rotatable members 602 and 603. The first end wall member 606 is fixed to an end of the first rotatable member 607. The second end wall member 607 is connected via splines to the first rotatable member 602. A working chamber 608 is formed by the first rotatable member 602, the second rotatable member 603, the first end wall member 606 and the second end wall member 607, and filled with a viscous fluid such as silicon oil. Therefore, a viscous coupling 630 is constructed by the above two rotatable members 602 and 603, the two end wall members 606 and 607, and the two resistance plates 604 and 605.

On the other hand, a front wheel side differential gear 610 is disposed within the outer case 601 to transmit a drive power from the outer case 601. The front wheel side differential gear 610 is composed of a differential case 609, a pinion shaft 612, pinion gears 613 rotatably supported by the pinion shaft 612, and two side gears 614 and 615 geared with the pinion gears 613. The two side gears 614 and 615 are connected via splines to the front left side wheel drive shaft 616 and the front right side wheel drive shaft 617.

Here, the differential case 609 is slidable relative to the pinion shaft 612. A movable member 619 is mounted on the differential case 609 by an engage member 618 and a differential case step portion 609b. The movable member 619 is made up of a cylindrical portion 619a located on the outer circumference of the differential case 609 and an engage piece 619b extending rightward in FIG. 11 from this cylindrical portion 619a. The engage piece 619b is fitted to a fitting groove 620 formed in the outer case 601 and extending in the axial direction of the right wheel drive shaft 617. An end of the engage piece 619b is engaged with a slidable operation member 621 provided on the outer circumferential wall of the outer case 601.

The differential case 609 is formed with a gear 622 on the inner circumference thereof and on the left side in FIG. 11. On the left side of this gear 622, an annular idling member 624 formed with an inner gear 623 is fitted and stopped by a stopper member 625. A gear 626 engageable with the gear 623 of the idling member 624 is formed on the side gear 614. An annular drive member 627 spline engaged with the second rotatable member 603 is disposed between the side gear 614 and the second end wall member 607. The drive member 627 is formed with a gear 628 on the outer circumference thereof. The gear 628 is engageable with the gear 622 of the differential case 609 and the gear 623 of the idling member 624.

Here, when the operation member 621 is slid to the position as shown in FIG. 11, since the differential case 609 is also shifted, the gear 622 of the differential case 609 is engaged with the gear 628 of the drive member 627. When the differential case 609 is moved leftward from the position shown in FIG. 11 to the position shown in FIG. 13; the gear 622 is disengaged from the gear 228. Therefore, the two gears 622 and 628 constitute a first clutch $C_1$ for engaging and disengaging the differential case 609 to and from the second rotatable member 603.

Further, when the operation member 621 is moved rightward as shown in FIG. 12, since the differential case 609 is also shifted rightward, the gear 622 is disengaged from the gear 628, and the projection portion 601a of the outer case 601 is fitted to the fitting groove 609a of the differential case 609. When shifted leftward conversely, the projection portion 601a is disengaged from the fitting groove 609a. Therefore, the fitting groove 609a and the projection portion 601a constitute a second clutch $C_2$ for engaging and disengaging the outer case 601 to and from the differential case 609.

The operation of the apparatus thus constructed will be described hereinbelow.

In this apparatus, when the first and second clutches $C_1$ and $C_2$ are engaged or disengaged, a drive power from the engine can be transmitted via different transmission routes, so that various drive conditions can be selected.

When the operating member 621 is slid to the position shown in FIG. 11, the gear 622 of the differential case 609 is engaged with the gear 628 of the drive member 627. That is, the first clutch $C_1$ is engaged so that the differential case 609 and the second rotatable member 603 are connected. Under these first clutch ($C_1$) engagement conditions, power is transmitted to the outer case 601, and further to the first rotatable member 602, and furthermore to the front wheels via the viscous coupling 630 and the differential gear 610 as shown by solid lines in FIG. 11. Therefore, a differential motion is obtained between the front wheels and the rear wheels, thus preventing the occurrence of tight corner braking phenomenon. Further, since the viscous coupling 630 is operative, it is possible to prevent any one of the front and rear wheels from being idled without transmitting power to the other wheels.

When the operation member 621 is slid rightward as shown in FIG. 12, the projection portion 601a of the outer case 601 is fitted to the fitting groove 609a of the differential) case 609. In this case, the gear 622 of the differential case 609 is disengaged from the gear 628 of the drive member 627, and the gear 628 of the drive member 627 and the gear 626 of the side gear 614 are engaged with each other via the gear 623 of the idling member 624. That is, the first clutch $C_1$ is disengaged and the second clutch $C_2$ is engaged, so that the outer case 601 is connected to the differential case 609, and the second rotatable member 603 is connected to the side gear 614. Once the second clutch $C_2$ is engaged, drive power transmitted to the outer case 601 is transmitted to the front wheels via the differential gear 610 as shown by dot-dashed lines in FIG. 12.

When there exists a difference in rotative speed between the left side wheel drive shaft 616 and the right side wheel drive shaft 617 in an automotive vehicle travelling on a muddy road, since the side gear 614 is connected to the second rotatable member 603, the relative rotation between the first rotatable member 602 and the second rotatable member 603 is limited by viscous resistance of the viscous coupling, so that the differential operation between the right side wheel drive shafts 616 and the differential case 609 is limited to improve the travelling performance on a muddy road.

When the operating member 621 is slid further leftward as shown in FIG. 13, the first and second clutches $C_1$ and $C_2$, are all disengaged. Under these conditions, an engine power is transmitted from the transfer 603 to only the rear wheels via the rear wheel side differential gear, so that the vehicle is driven in the ordinary two rear wheel drive mode. In this case, the front wheels are rotated by the moving vehicle when the rear wheels are driven, and therefore the differential case 609 of the front wheel side differential gear 610 is rotated. However, since the clutches $C_1$ and $C_2$ are disengaged, power will not be transmitted to the first rotatable member 602 of the viscous coupling 630; that is, the viscous coupling 630 is not rotated by the moving vehicle driven in two rear wheel drive mode, thus reducing travelling resistance, fuel consumption rate and vibration.

As described above, since the first and second clutches $C_1$ and $C_2$ are disposed within the outer case 601, whenever the operating member 621 is slid, the two clutches $C_1$ and $C_2$ are engaged or disengaged, and therefore it is possible to obtain appropriate drive conditions according to road conditions and travelling state. Therefore, it is possible to simplify the control system for providing appropriate drive modes. As a result, it is possible to reduce the cost of the apparatus and the occurrence of trouble.

Further, since the first and second clutches $C_1$ and $C_2$ are disposed within the outer case 601 and further the operating member 621 for sliding the differential case 609 is disposed on the outer circumference of the outer case 601, it is possible to make compact the apparatus, thus increasing the freedom of the layout of the power transmission apparatus on the vehicle body.

Figure 14:
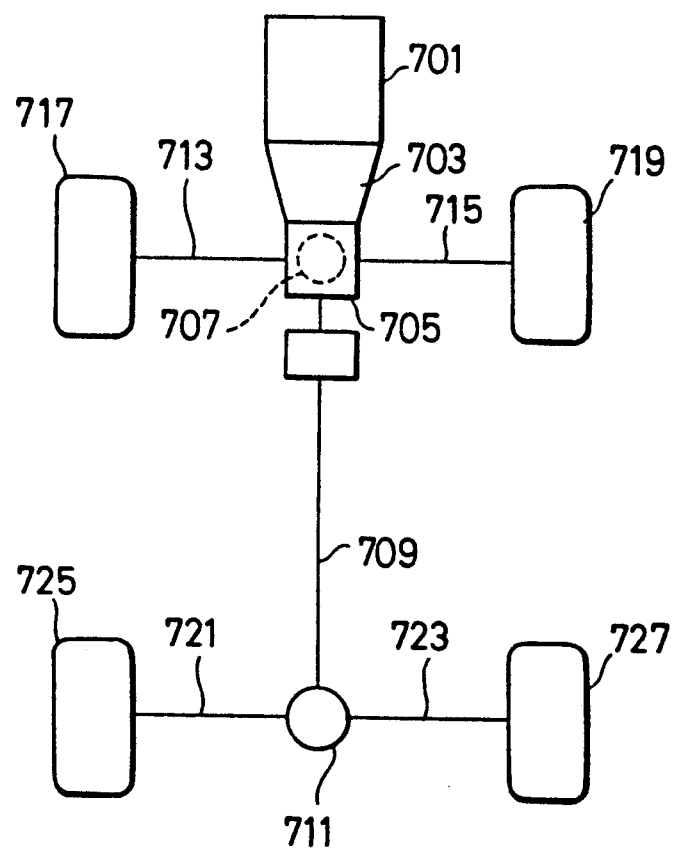
FIG. 14 is a diagrammatical illustration showing an automotive vehicle driving system to which an eighth embodiment of the power transmission apparatus according to the present invention is applied.
Figure 15:
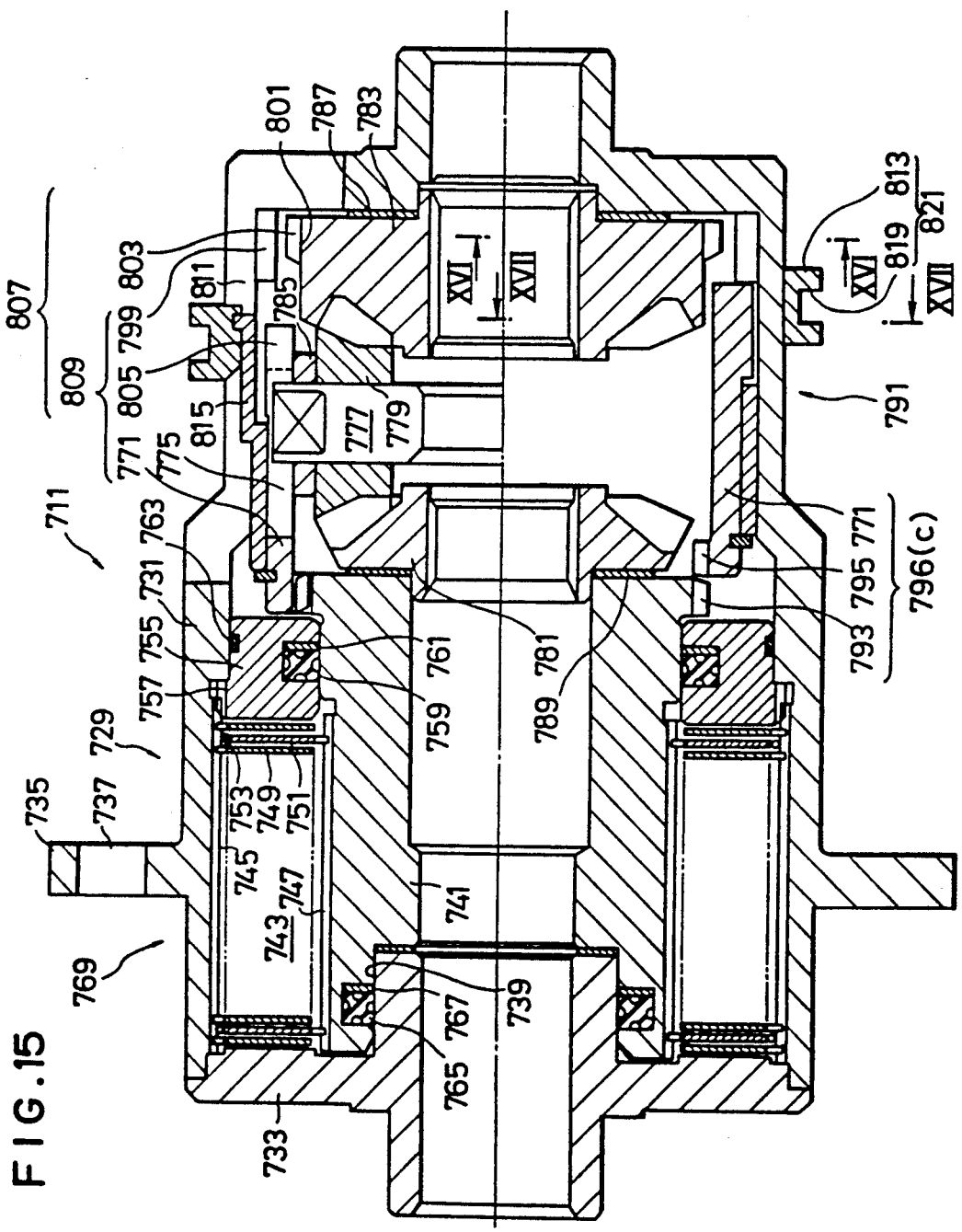
FIG. 15 is a cross-sectional view showing the eighth embodiment of the power transmission apparatus.
Figure 16:
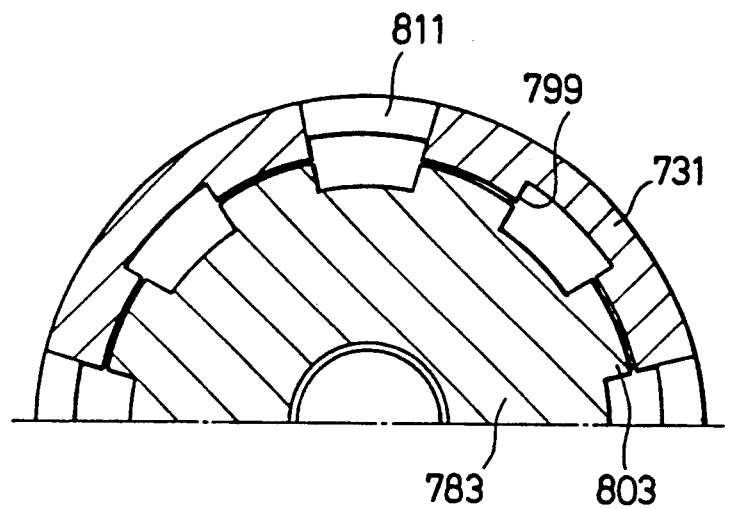
FIG. 16 is a half cross-sectional view taken along the line XVI—XVI in FIG. 15.
Figure 17:
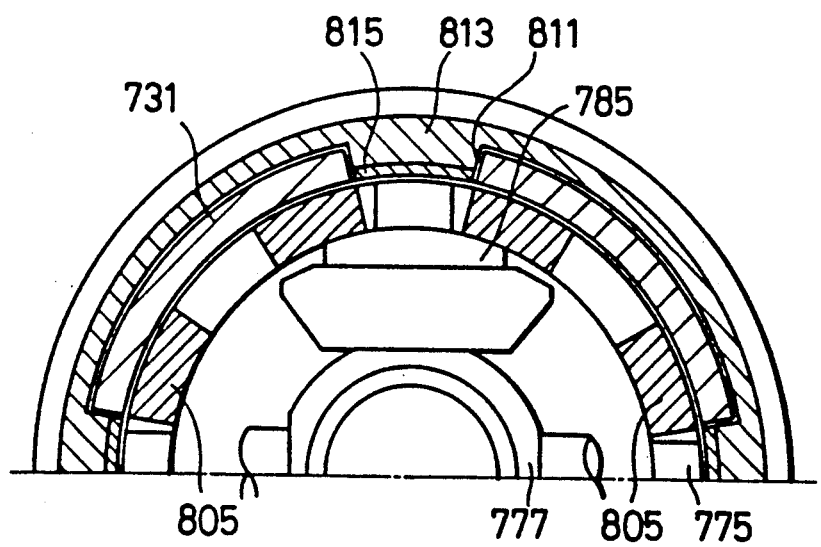
FIG. 17 is a half cross-sectional view taken along the line XVII—XVII in FIG. 15.

An eighth embodiment of the power transmission apparatus according to the present invention will be described with reference to FIGS. 14 to 21. In FIG. 15, the upper half shows an engaged state and the lower half shows a disengaged state. Further, FIG. 14 shows a 4WD vehicle in which the apparatus of the present invention is used as a rear wheel side drive system.

The power transmission route will be described with reference to FIG. 14. A drive power of an engine 701 is speed changed via a transmission 703, and transmitted to a transfer 705. The power transmitted to the transfer 705 is transmitted to a front wheel differential gear 707, and to the viscous coupling of the power transmission apparatus 711 according to the present invention via a change-direction gear assembly and a built-in 2-4WD switching mechanism (both not shown) and a propeller shaft 709. Engine power transmitted to the front differential gear 707 is distributed differentially to the front left and right wheels 717 and 719 via front wheel shafts 713 and 715. The power transmission apparatus 711 transmits power from the viscous coupling to the rear differential gear which distributes differentially power to the rear left and right wheels 725 and 727 via two rear wheel shafts 721 and 723. Further, the 2-4 WD switching mechanism is a mechanism for interrupting power from the rear wheels 725 and 727.

The embodiment will be described with reference to FIG. 15. A housing 729 is composed of a housing body 731 and a side plate member 733, and rotatably supported by a differential carrier (not shown) for housing the power transmission apparatus 711 via a bearing (not shown). The housing 729 is formed with a flange portion 735 having bolt holes 737 to which a ring gear is fastened by bolts. The ring gear (not shown) is engaged with a drive pinion connected to the propeller shaft 709, and constitutes a final reduction gear assembly together with a drive pinion. As described above, the housing 729 is driven by a drive power from the engine 701.

Within the housing 729, a side plate member 733 is formed with a shaft supported portion 739 for rotatably support an inner hub member 741. An annular working chamber 743 is formed between the inner hub member 741 and the housing body 731, and filled with a viscous fluid such as silicon oil. Within the working chamber 743, the housing body 731 is formed with splines 745 to which plural outer plates 749 are engaged, and the hub member 741 is formed with splines 747 to which plural inner plates 751 are engaged. These plates 749 and 751 are arranged alternately, and a spacer 753 is disposed between two outer plates 749 to keep a gap between the two appropriately. Further, a ring 755 is disposed on the right end of the working chamber 743, whose outer splines 757 are engaged with splines 745 of the housing body 731. An X-shaped cross-section rubber seal 759 and a backup ring 761 are disposed between the ring 755 and the hub member 741; an O-ring 763 is disposed between the ring 755 and the housing body 731; and an X-ring 765 and a backup ring 767 are disposed between the housing body 731 and the hub member 741 at the shaft support portion 739. A viscous coupling 769 is thus constructed.

Within the housing 729, a clutch ring 771 corresponding to a differential case is disposed on the right side of the viscous coupling 769, and rotatably and axially slidably supported by the housing 729. Four axial grooves 775 are formed on the inner circumference of the clutch ring 771. A cross-shaped pinion shaft 777 is engaged with these grooves 775 so as to be axially movable. Therefore, the clutch ring 771 is rotatable together with the pinion shaft 777 and slidable relative to the housing 729 and the pinion shaft 777. Four pinion gears 779 are rotatably supported by the pinion shaft 777. On both the sides of the pinion gears 779, two side gears 781 and 783 are disposed coaxially and engaged with the pinion gears 779. A spherical washer 785 is disposed between the clutch ring 771 and the pinion gear 779; a washer 787 is disposed between the housing body 731 and the lefthand side gear 783; and a washer 789 is disposed between the hub member 741 and the righthand side gear 781, respectively to constitute a rear differential gear 791. The lefthand side gear 781 is spline engaged with a transmission shaft (not shown) connected to the rear wheel shaft 721 via a joint (not shown), and the righthand side gear 783 is spline engaged with a transmission shaft (not shown) connected to the rear wheel shaft 723 via a joint (not shown).

The hub member 741 is formed with splines 793 on the right side outer circumference thereof, and the clutch ring 771 is formed with splines 795 engaged with the splines 793 on the left side inner circumference thereof.

The clutch ring 771, the splines 795 of the clutch ring 771, and the splines 793 of the hub member 741 constitute a clutch means 796 for engaging the viscous coupling 769 to and from the rear differential gear 791.

A first engage portion (gear) 799 is formed on the right end inner circumference of the housing 729. Further, a second engage portion (gear) 803 having the same pitch as the gear 799 is formed on the outer circumference of the right side gear 783. An appropriate gap is formed between the inner circumferential surface of the gear 799 and the outer circumferential surface of the gear 803. The axial width of the gear 799 is larger than that of the gear 803, and projects inward (toward the left side in FIG. 15. On the other hand, engage grooves 805 engageable with the gear 799 and 803 are provided on the right end of the clutch ring 771. The clutch ring 771, the engage grooves 805 of the clutch ring 771, the gear 799 of the housing 729, and the gear 803 of the righthand side gear 783 constitute a differential lock mechanism 807 for locking the differential operation of the differential gear 791. Further, the clutch ring 771, the engage grooves 805 of the clutch ring 771, and the gear 799 of the housing 729 constitute a switching means 809 for connecting the differential gear 791 to the housing 729 to directly transmit power to the differential gear 791 without passing through the viscous coupling 769.

The housing body 731 of the housing 729 is formed with plural slot windows 811 at regular angular intervals. Further, a slide ring 813 is axially movably fitted to the outer cylindrical circumference of the housing body 731. The slide ring 813 is formed with plural arm 815 passed through the slot windows 811 into contact with the clutch ring 771. Further, a fork (not shown) is slidably engaged with a groove 819 formed in the outer circumference of the slide ring 813. The fork, the slide ring 813 and the arms 815 constitute a shifting means 821 for the clutch ring 771.

Figure 18:
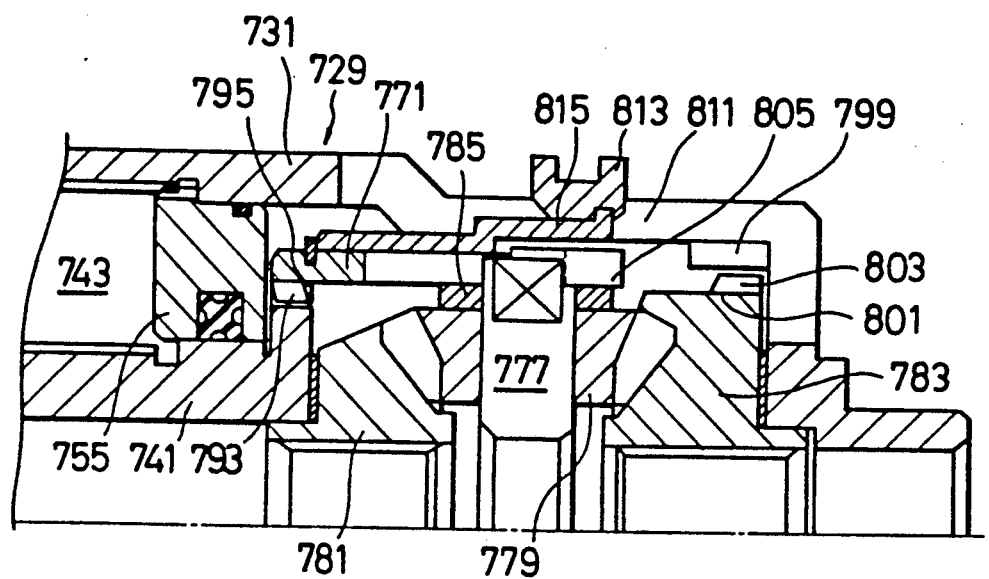
FIGS. 18, 19, 20 and 21 are partial cross-sectional view showing the eighth embodiment, for assistance in explaining the function thereof.

When the clutch ring 771 is moved leftward by operating the fork, the splines 793 are engaged with the splines 795 to connect the hub member 741 to the clutch ring 771 as shown by the upper half in FIG. 15 or in FIG. 18.

Figure 19:
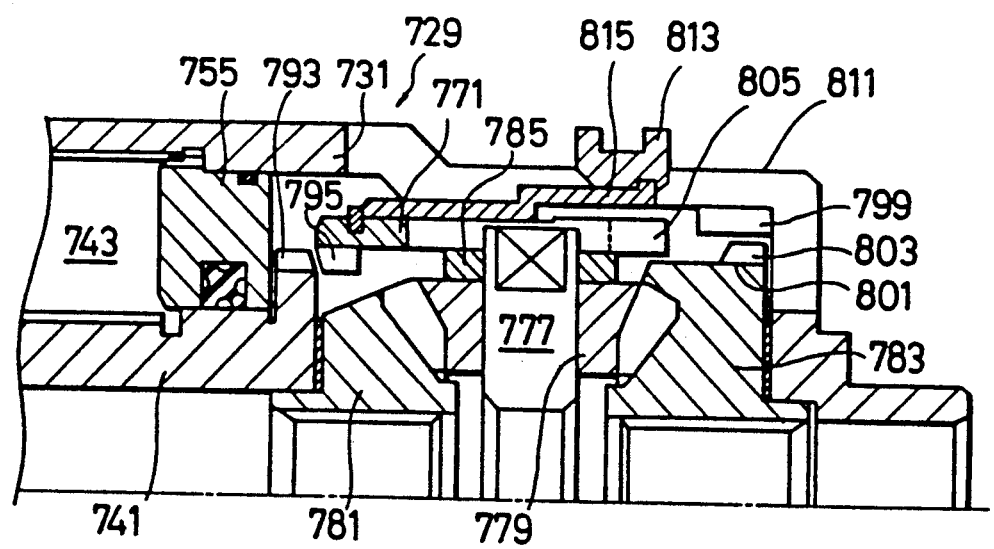

When the clutch ring 771 is moved rightward by operating the fork, the splines 793 are disengaged from the splines 795 to disconnect the hub member 741 from the clutch ring 771 as shown by the lower half in FIG. 15 or in FIG. 19.

Figure 20:
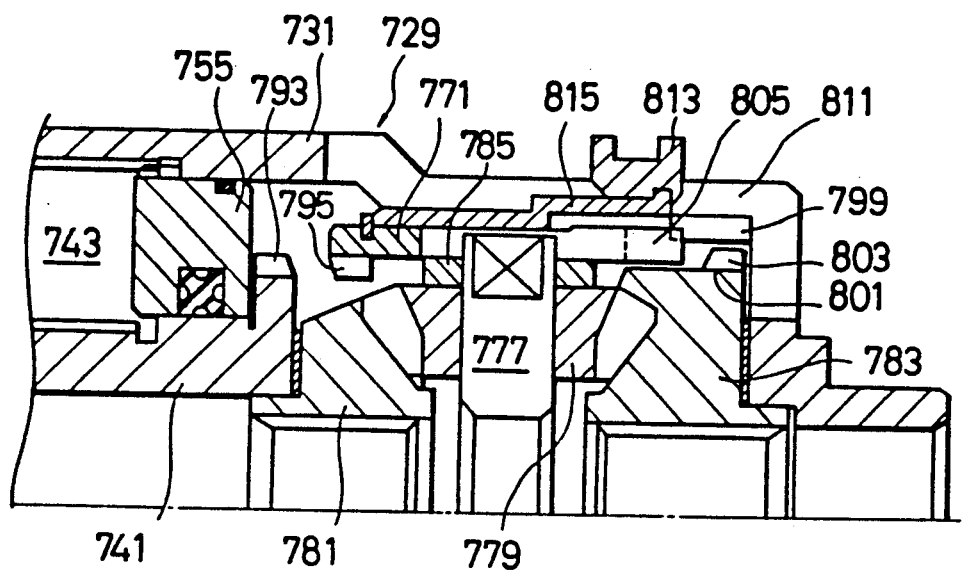

When the clutch ring 771 is moved further rightward by operating the fork, the engage grooves 805 are engaged with the gear 799 to connect the housing 729 to the clutch ring 771 as shown in FIG. 20.

Figure 21:
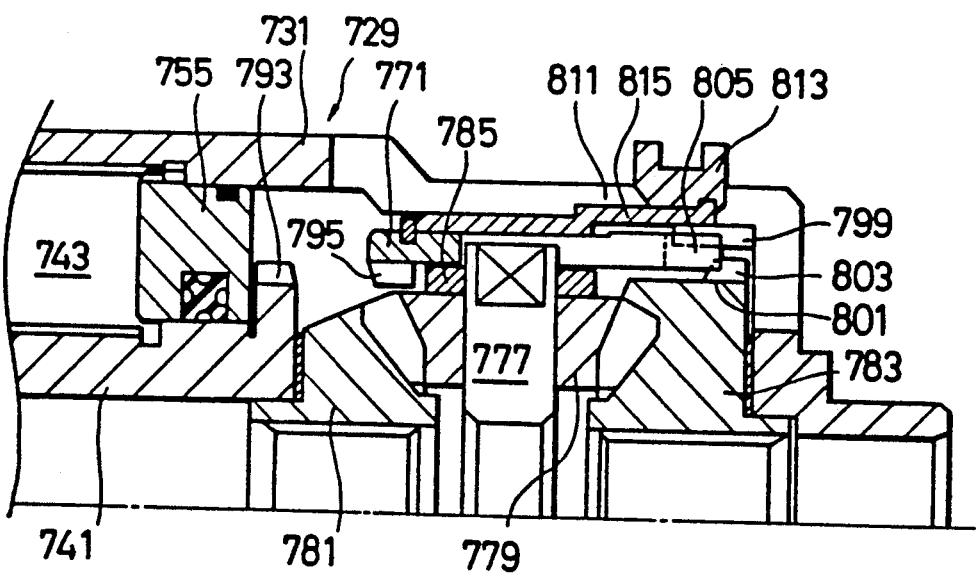

When the clutch ring 771 is moved to the rightmost end by operating the fork, the engage grooves 805 are engaged with the gear 799 and further the gear 803 to connect the housing 729 to the clutch ring 771 and the righthand side gear 783 as shown in FIG. 21.

The above-mentioned fork operation can be achieved manually by the driver or automatically according to the steering angle, the acceleration, the braking, etc.

The function of this embodiment will be described hereinbelow. When the clutch ring 771 is engaged with the hub member 741 as shown by upper half in FIG. 15 or in FIG. 18, engine power is transmitted to the rear differential gear 791 via the viscous coupling 769. In this case, when there exists a large difference in rotative speed between the housing 729 and the hub member 741 due to unbalance between engine drive power applied to the housing 729 of the viscous coupling 769 and the drive resistance of the rear wheels 725 and 727, the differential rotation is largely restricted owing to the shearing resistance of the silicon oil, so that a large drive power is transmitted to the rear wheels 725 and 727. Further, when the rotative difference is small, a large differential revolution is allowed, and a small torque is transmitted to the rear wheels 725 and 727.

When the clutch ring 771 is disengaged from the hub member 741 as shown in the lower half in FIG. 15 or in FIG. 19, power transmission is interrupted between the viscous coupling 769 and the rear differential gear 791, so that the rear wheels 725 and 727 rotate free.

When the clutch ring 771 is disengaged from the hub member 741 and engaged with the housing 729 as shown in FIG. 20, engine power is transmitted to the rear differential gear 791 via the housing 729. The rear differential gear 791 differentially distributes the transmitted power to the rear left and right wheels 725 and 727 via the rear wheel shafts 721 and 723.

When the clutch ring 771 is disengaged from the hub member 741 and engaged with the housing 729 and the righthand side gear 783 as shown in FIG. 21, since the housing 729 is connected to the righthand side gear 783 and therefore the differential lock mechanism 807 is operative to lock the differential operation, engine power is directly transmitted, so that the vehicle can be extricated from a muddy road.

The function of the eighth embodiment will be explained in relation to a vehicle drive system shown in FIG. 14 when the viscous coupling 769 is engaged with the rear differential gear 791, the vehicle is driven in full-time 4WD mode. Under these conditions, since the front wheels 717 and 719 are driven directly and the rear wheels 725 and 727 are driven via the viscous coupling 769, it is possible to improve the vehicle safety, steering stability, and travelling performance on muddy roads.

When the vehicle travels on a paved road without large acceleration and braking, the difference in rotative speed between the front wheels 717, 719 and the rear wheels 725 and 727 (the difference in rotative speed between the input and output elements of the viscous coupling 769) is small. Therefore, since drive power transmitted to the rear wheels 725 and 727 is small, the vehicle travels in such a drive power distribution mode as FF (front engine and front drive) 2WD (two wheel drive) mode.

When the front wheels 717 and 719 slip, since the difference in rotative speed of the viscous coupling 769 increases, a large power is transmitted to the rear wheels 725 and 727, so that the vehicle can travel smoothly.

Further, when the vehicle is turned sharply at a low speed as when put into a garage, since difference in rotative speed between the front and rear wheels is small, this rotation difference can be absorbed by the viscous coupling 769, so that it is possible to effect smooth turning without producing tight corner braking phenomenon.

When the viscous coupling 769 is disengaged from the rear differential gear 791, the vehicle is switched to a perfect 2WD state, so that the vehicle can travel in a mode equivalent to an FF mode.

During the 2WD travelling, when the 2-4WD switching mechanism of the transfer 705 is switched to 2WD side, the propeller shaft 709, the final reduction gear assembly, and the viscous coupling 769 which constitute the rear wheel drive system stop rotating. Therefore, it is possible to reduce abrasion, noise, vibration, fuel consumption rate; etc. due to wasteful revolutions of these elements; that is, it is possible to obtain the same effect as free hub clutch. When the viscous coupling 769 is disengaged from the rear differential gear 791 and further the rear differential gear 791 is engaged with the housing 729, the vehicle becomes a rigid 4WD mode, in which all the four wheels 717, 719 and 725 and 727 are driven directly.

Further, when the rear differential gear 791 is connected to the differential lock mechanism 807, the differential function between the rear left and right wheels 725 and 727 is locked. That is, when one of the rear wheel is slipping on a muddy road without lock, the differential revolution between the two rear wheels 725 and 727 increased, so that it is impossible to drive the vehicle away from a muddy road. However, when the rear differential 791 is connected to the differential lock mechanism 807, since the differential function between the two rear wheels 725 and 727 can be locked, engine power is directly transmitted to the two rear wheels 725 and 727 to drive the vehicle away from a muddy road.

In the power transmission apparatus 711 of the present invention, since the viscous coupling 769 and the differential gear 791 are assembled together, it is possible not to mount the power transmission apparatus 711 on the propeller shaft 709 as is conventional, thus reducing an increase in the inertial moment of the propeller shaft 709 and therefore preventing vibration. Further, the propeller shaft 709 is not divided, and no propeller shaft supporting members are required.

Further, in this embodiment, since the viscous coupling 769 and the differential gear 791 are disposed along the axial direction thereof, the diameter of the inner hub member 741 is smaller than that of the clutch ring 771, thus reducing the diameter of the apparatus 711. Therefore, when used for a vehicle, there exists such an advantage that the height between the vehicle bottom and the ground can be increased. Further, since the diameter of the viscous coupling 769 is reduced, the relative rotative speed between the housing 729 and the inner hub member 741 can be reduced, and therefore it is possible to improve the life of the X-shaped rings 759 and 765.

Further, in this embodiment, the switching means 809 for transmitting power to the differential gear 791 without use of the viscous coupling 769 is provided for the apparatus 711, it is possible to obtain rigid 4WD mode. Therefore, even if the viscous coupling 769 develops trouble, it is possible to drive the vehicle in 4WD mode.

Further, in this embodiment, since the differential lock mechanism 807 for locking the differential function of the differential gear 791 is provided for the apparatus 711, it is possible to improve the extricability of the vehicle from a muddy road.

Figure 22:
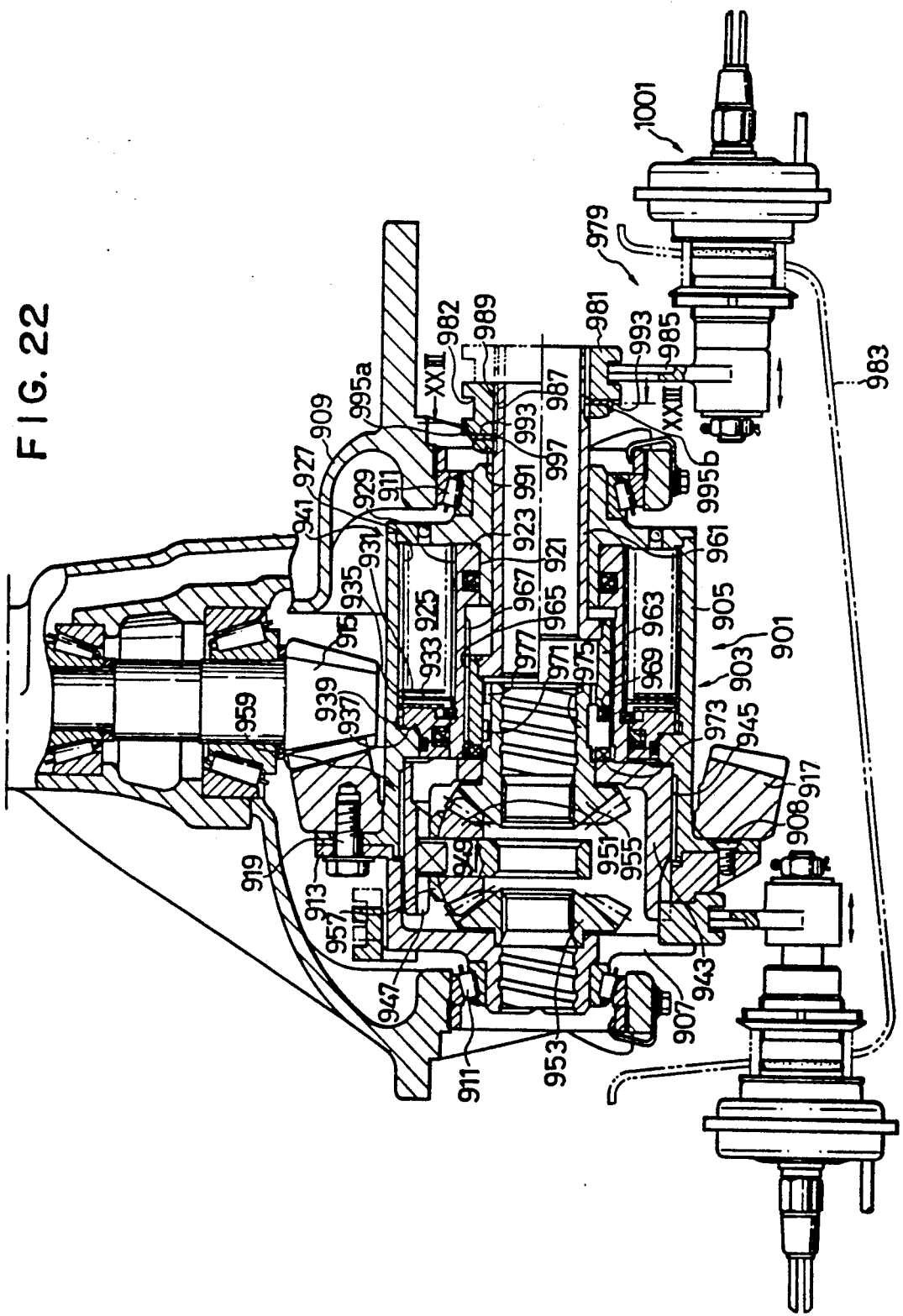
FIG. 22 is a cross-sectional view showing a ninth embodiment of the power transmission apparatus according to the present invention.

FIG. 22 shows a ninth embodiment of the power transmission apparatus according to the present invention, in which a shift device locating mechanism is used for a rear wheel side power transmission apparatus. Further, in FIG. 22, the upper half indicates a first engage state and the lower half indicates a second engage state.

A housing 903 of the power transmission apparatus 901 is composed of a housing body 905 and an end cover 907, being temporarily fixed by screws 908. The housing 903 is rotatably supported by a differential carrier 909 for housing the apparatus 901 via bearings 911. The housing 903 is formed with a flange portion 913 to which a ring gear 917 engaged with a drive pinion 915 on a propeller shaft (not shown) is fastened by bolts 919 at bolt holes.

As described above, the housing 903 is driven by an engine power. Within the housing 903, the housing body 905 is formed with a shaft support 921 for rotatably supporting an inner hub member 923. An annular working chamber 925 is formed between the hub member 923 and the housing body 905 and filled with a viscous fluid such as silicon oil.

Within the working chamber 925, the housing body 905 is formed with inner splines 927 to which plural outer plates 931 are engaged. The hub member 923 is formed with outer splines 929 to which plural inner plates 933 are engaged. These plates 931 and 933 are disposed alternately. A spacer 935 is disposed between the two outer plates 933 to keep an appropriate interval therebetween. Further, a ring 937 is disposed on the left end of the working chamber 925, whose splines 939 formed on the outer circumference of the ring 937 are engaged with the splines 927 of the housing body 905. As described above, the viscous coupling can be constructed.

Within the housing 903, a clutch ring 943 corresponding to a differential case is disposed on the left side of the viscous coupling 941, and rotatably supported by the housing 903 via a needle bearing 945.

The clutch ring 943 is formed with four axial grooves 947 on the inner circumference thereof. Ends of a cross-shaped pinion shaft 949 are engaged with these grooves 947. Therefore, the clutch ring 943 can rotate together with the pinion shaft 949. Pinion gears 951 are rotatably supported by the pinion shaft 949. On both the sides of the pinion gears 951, two side gears 953 and 955 are disposed coaxially so as to be engaged with the pinion gears 951. A spherical washer 957 is disposed between the clutch ring 943 and the pinion gears 951. As described above, a differential gear 959 is constructed.

The lefthand side gear 953 is spline engaged with a lefthand connecting shaft coupled to the rear left side wheel shaft via a joint, and the righthand side gear 955 is spline engaged with a righthand connecting shaft coupled to the rear right side wheel shaft via joint (all not shown).

Within the housing 903 or the housing body 905, a hollow rod 961 is rotatably and axially slidably arranged coaxially with the side gears 953 and 955. An annular engage member 963 is disposed on the left end of the rod 961, and formed with splines 965 on the outer circumference thereof. The engage member 963 is engaged via splines with splines 967 formed on the inner circumference of the hub member 923 so as to be axially slidable. Further, the engage member 963 is formed with a clutch claw 969 on the left end surface and splines 971 on the inner circumference thereof.

A clutch claw 973 engageable with the clutch claw 969 of the engage member 963 is provided at the right end of the clutch ring 943. Further, splines 977 engageable with the splines 971 of the engage member 963 are provided on the right end outer circumference of a boss 975 of the right side gear 955.

The engage member 963 is moved via the rod 961 between the engage and disengage positions of the viscous coupling 941 and the clutch ring 943 and to a position at which the engage member 963 is engaged with the right side gear 955. This engage member 963 is moved by operating a shift device 979.

When the engage member 963 is moved leftward, as shown by the upper half in FIG. 22, since the clutch claw 969 of the engage member 963 is engaged with the clutch claw 973 of the clutch ring 943, the hub member 923 is engaged with the clutch ring 943 via the engage member 963. Further, when the engage member 963 is moved rightward, as shown by the lower half, since the inner splines 971 of the engage member 963 are engaged with the outer splines 977 of the boss of the right side gear 955, the hub member 923 is engaged with the right side gear 955 via the engage member 963.

The shift device 979 is composed of a sleeve 981 disposed on the differential carrier side 909, and a fork 985 disposed on the cover side 983.

In this embodiment, the sleeve 981 is formed on the outer circumference thereof with a groove 982 to which the fork 985 is fitted, and axially movably fixed via thread to the rod 961 on the differential carrier side 909. That is, the rod 961 is formed with a thread 987 formed on the right end outer circumference thereof, and the sleeve 981 is formed with a thread 989 engageable with the thread 987 of the rod 961 on the inner circumference thereof. Therefore, the sleeve 981 is movable in the axial direction of the rod 961 via the threads 989 and 987, so that the position of the sleeve 981 is adjustable by shifting the sleeve 981 along the rod 961.

Figure 23:
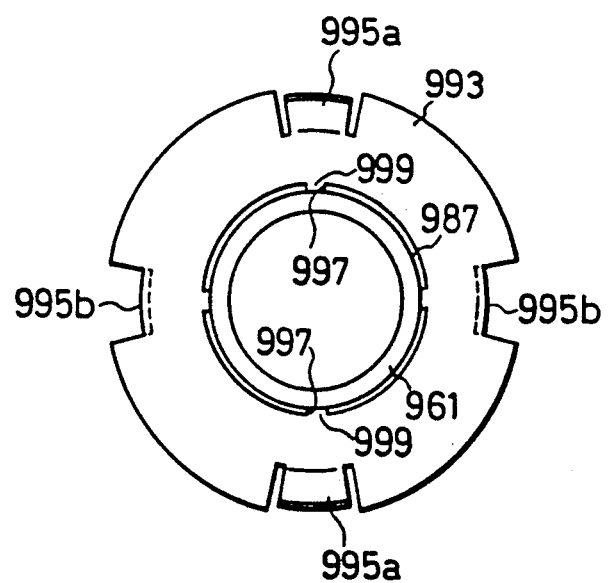
FIG. 23 is a cross-sectional view taken along the line XXIII—XXIII in FIG. 22.

A lock nut 991 and a bent washer 993 are provided for the rod 961 to fix the sleeve 981 at position. This bent washer 993 is disposed between the lock nut 991 and the sleeve 981, and formed with plural bent portions 995a and 995b at the outer circumference as shown in FIG. 23 and with plural engage pieces 999 engageable with the grooves 997 (four in this embodiment) axially formed on the outer circumference of the rod 961.

On the other hand, the fork 985 engaged with the sleeve 981 and an actuator 1001 for shifting the fork 985 are mounted on the rear cover 983.

The positional relationship between the fork 985 disposed on the cover side 983 and the sleeve 981 can be adjusted by moving the sleeve 981 along the rod 961 via the threads 989 and 987. Under these conditions, the lock nut 991 is fastened toward the sleeve side 981 to sandwich the bent washer 993 between the lock nut 991 and the sleeve 981; that is, the sleeve 981 is fixed by bending the bent portion 995 toward the outer circumferences of the lock nut 991 and the sleeve 981. As described above, since the sleeve 981 can be shifted adjustably relative to the fork 985, it is possible to fix the fork 985 to the cover 983.

Therefore, it is possible to use the differential carrier 909 in common by simply replacing only the cover 983 in the case of the differential gear having no actuator 1001.

Further, since the mutual position between the fork 985 and the sleeve 981 can be adjusted to an appropriate position, even if there exist dimensional errors or assembling error, it is possible to prevent maloperation, abnormal abrasion, etc.

Figure 24:
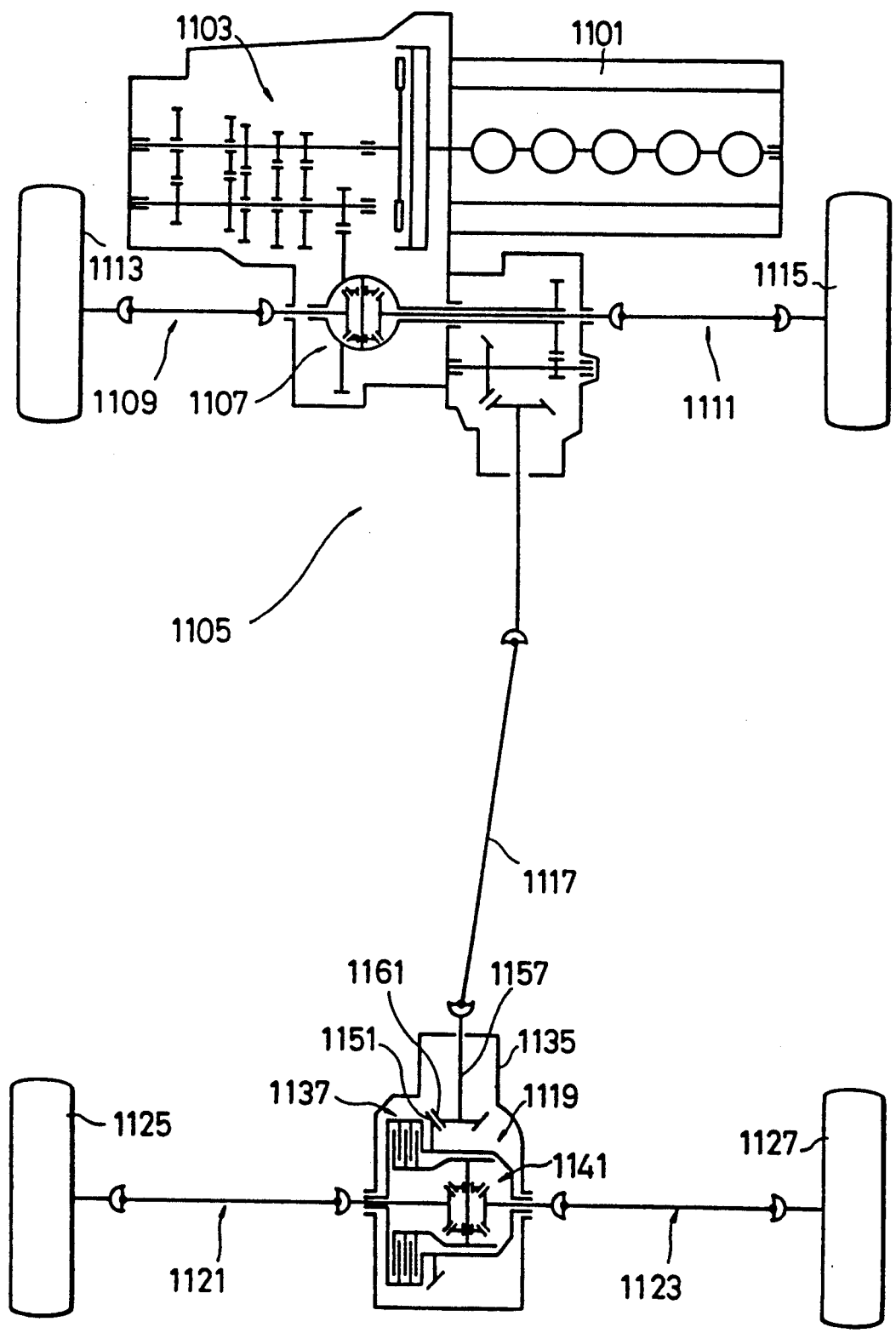
FIG. 24 is a skeletal view showing an automotive vehicle driving system to which a tenth embodiment of the power transmission apparatus according to the present invention is applied.
Figure 25:
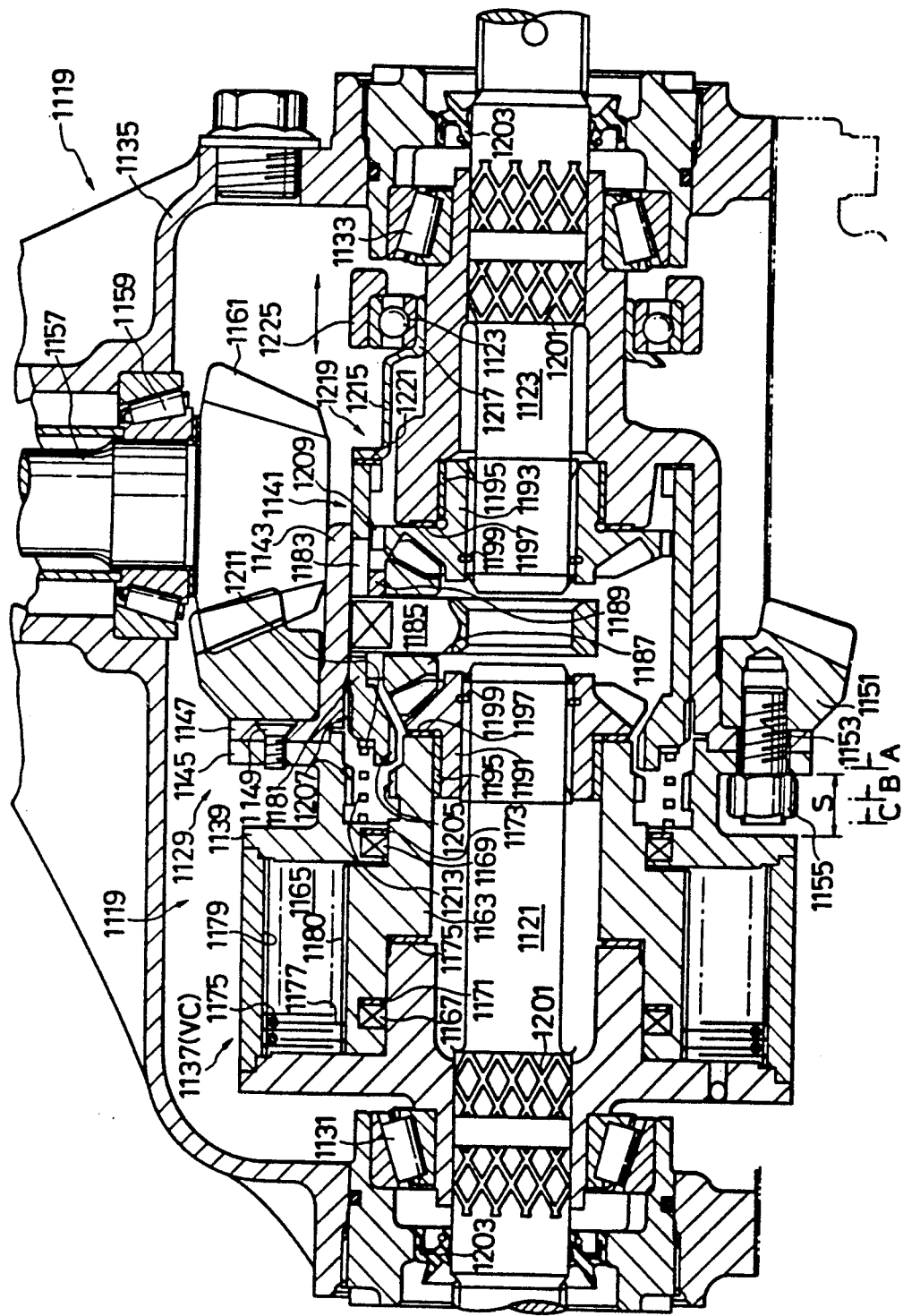
FIG. 25 is a cross-sectional view showing the tenth embodiment of the power transmission apparatus.

FIGS. 24 and 25 show a tenth embodiment of the present invention. The power transmission apparatus of the present invention is used as a power system of a vehicle shown in FIG. 24. The upper side in FIG. 25 corresponds to the front side in FIG. 24.

The vehicle shown in FIG. 24 is an FF 4WD vehicle in which an engine is directly coupled to the front wheels. This power system is composed of an engine 1101, a transmission 1103, a transfer 1105, a front wheel side differential gear 1107, front wheel shafts 1109 and 1111, front wheels 1113 and 1115, a propeller shaft 1117, a rear differential gear 1119 (power transmission apparatus of the invention), rear wheel shafts 1121 and 1123, and rear wheels 1125 and 1127.

A housing 1129 of the rear differential gear 1119 is rotatably supported by a differential carrier 1135 via bearings 1131 and 1133. The differential carrier 1135 is filled with gear oil. The housing 1129 is composed of a casing 1139 of a viscous coupling 1137 and a differential case 1143 of the differential gear 1141. The casing 1139 and the case 1143 are fixed by fixing two flanges 1145 and 1147 thereof with screws.

A ring gear 1151 is fixed to the differential case (1143) side of the flanges 1145 and 1147 with stud bolts 1153 and nuts 1155. For fixing, nuts 1155 are inserted between the flange 1145 and the viscous coupling 1137 and rotated to rotate the bolts in the fastening direction. The space S for the nuts 1155 is remarkably reduced as compared with the conventional space.

A drive pinion shaft 1157 is rotatably supported by the differential carrier 1135 via a bearing 1159 provided on the propeller shaft (1117) side as shown in FIG. 25. The drive pinion shaft 1157 is formed with a drive pinion gear 1161 engageable with the ring gear 1151 at an end thereof. As described above, the housing 1129 is driven by engine power.

Within the casing 1139, an inner hub member 1163 is rotatably disposed. A working chamber 1165 is formed between these members 1139 and 1163, and its watertightness is attained by X-rings 1167 and 1169 and backup rings 1171 and 1173. A washer 1175 is disposed between the members 1139 and 1163. The working chamber 1165 is filled with a high viscous silicon oil. A pair of plate assemblies composed of plural alternately arranged plates 1175 and 1177 are engaged with splines 1179 of the casing 1139 and splines 1180 of the hub member 1163, separately to constitute a viscous coupling 1137.

When the housing 1129 (casing 1139) is rotated by engine power, this revolution is transmitted from the plates 1175 to the plates 1177 by a shearing force of the silicon oil to rotate the hub member 1163. In this case, when a difference in rotative speed between the two members 1139 and 1163 is large, the rotational difference is restricted to transmit a large torque. When the difference is small, the rotational difference is absorbed to transmit a small torque.

Within the differential case 1143, a drive ring 1181 is rotatably and axially movable disposed. The drive ring 1181 is formed with axial grooves 1183 to which ends of the pinion shafts 1185 are engaged. Pinion gears 1187 are rotatably supported by the pinion shafts 1185, and a washer 1189 is disposed between the drive ring 1181 and the pinion gears 1187. The pinion gears 1187 are engaged with a pair of side gears 1191 and 1193 from both the sides thereof. A washer 1195 and a backup ring 1197 are disposed between the lefthand side gear 1191 and the hub member 1163, and a washer 1195 and a backup ring 1197 are disposed between the righthand side gear 1193 and the differential case 1143. The differential gear 1141 is thus constructed. Two rear wheel shafts 1121 and 1123 are spline engaged with the left and right side gears 1191 and 1193. Stopper rings 1199 are provided for these splines respectively.

The rear wheel shafts 1121 and 1123 are rotatably supported by the housing 1129. Oil grooves 1201 are formed at the support portion. Further, seals 1203 are disposed between the rear wheel shafts 1121 and 1123 and the differential carrier 1135.

When a torque is inputted to the drive ring 1181 and therefore the drived ring 1181 rotates, power is differentially distributed to the rear left and right wheels 1125 and 1127 via the pinion shaft 1185, the pinion gears 1187, two side gears 1191 and 1193, and the rear wheel shafts 1121 and 1123 owing to the self revolution of the pinion gears 1187.

The hub member 1163 is formed with splines 1205; the casing 1139 of the viscous coupling 1137 is formed with splines 1207; the drive ring 1181 is formed with splines 1205 at the lefthand inner circumference thereof; and the righthand side gear 1193 is formed with splines 1209 on the outer circumference thereof. These splines are engaged or disengaged when the drive ring 1181 is moved right and left. The spline engagement order is as follows: all the splines are disengaged as shown in FIG. 25 (position A); the drive ring 1181 is moved leftward and therefore the splines 1205 are engaged (position B); the splines 1205 are kept engaged and further the splines 1207 are engaged (position C).

At position A, since power transmission is disconnected between the housing 1129 and the viscous coupling 1137 or the differential gear 1141, the rear wheels 1125 and 1127 rotate free.

At position B, engine power is transmitted to the differential gear 1141 via the viscous coupling 1137.

At position C, engine power is directly transmitted from the housing 1129 to the locked differential gear 1141 passing the viscous coupling 1137.

A return spring 1213 is disposed between the casing 1139 and the drive ring 1181 to urge the drive ring 1181 rightward via the washer 1211. A sleeve 1217 having an arm 1215 is slidably fitted to the right end outer circumference of the housing 1129. This arm 1215 is passed through a cutout 1219 formed in the housing 1129 into contact with the drive ring 1181 via a washer 1221. An end of the fork 1225 is rotatably fitted to the outer circumference of the sleeve 1217 via a bearing 1223. The drive ring 1181 is moved right and left as shown by an arrow in FIG. 25 by the above operation system driven by a hydraulic actuator (not shown).

The shift operation of the drive ring 1181 is effected manually by the driver or automatically according to steering conditions or road surface conditions.

The function will be described hereinbelow. When the power transmission apparatus 1119 is set to position A during travel on a paved road, the vehicle can travel in FF 2WD mode, so that it is possible to improve the fuel consumption rate as compared with when the vehicle travels in 4WD mode. Further, since rotational difference between the front and rear wheels on a paved road is small, even if set to position B, a transmission torque through the viscous coupling 1137 is small, so that the vehicle travels in a mode equivalent to 2WD mode.

When the vehicle travels on a muddy road with the apparatus 1119 set to position B and further the front wheels 1113 and 1115 slip, since a large rotational difference is produced between the front and rear wheels, a large torque is transmitted via the viscous coupling 1137 to the rear wheels 1125 and 1127, so that the vehicle can travel smoothly on or away from a muddy road without being stuck. Further, it is possible to obtain a differential locked state when the apparatus 1119 is set to position C.

When the apparatus 1119 is set to position A or B during vehicle turning, it is possible to turn the vehicle smoothly. Further, when the vehicle is turned quickly at a low speed as when put into a garage, it is possible to prevent tight corner braking phenomenon when the apparatus 1119 is set to position A or B.

As described above, since a space for inserting nuts is small, it is unnecessary to place the viscous coupling 1137 axially away from the ring gear 1151 to prevent interference with the stud bolts 1153 or nuts 1155. Therefore, it is possible to increase the diameter of the viscous coupling 1137 and therefore to increase the torque. In addition, the space of the bearings 1131 and 1133 is small, the rigidity of the housing 1129 is high and therefore noise or vibration can be prevented.

Further, in this embodiment, it is possible to use the viscous coupling as a differential restriction mechanism of the differential gear or to use a friction clutch such as a multidisk clutch instead of the viscous coupling. Further, it is possible to construct the apparatus with the differential gear as a central differential gear.

Figure 26:
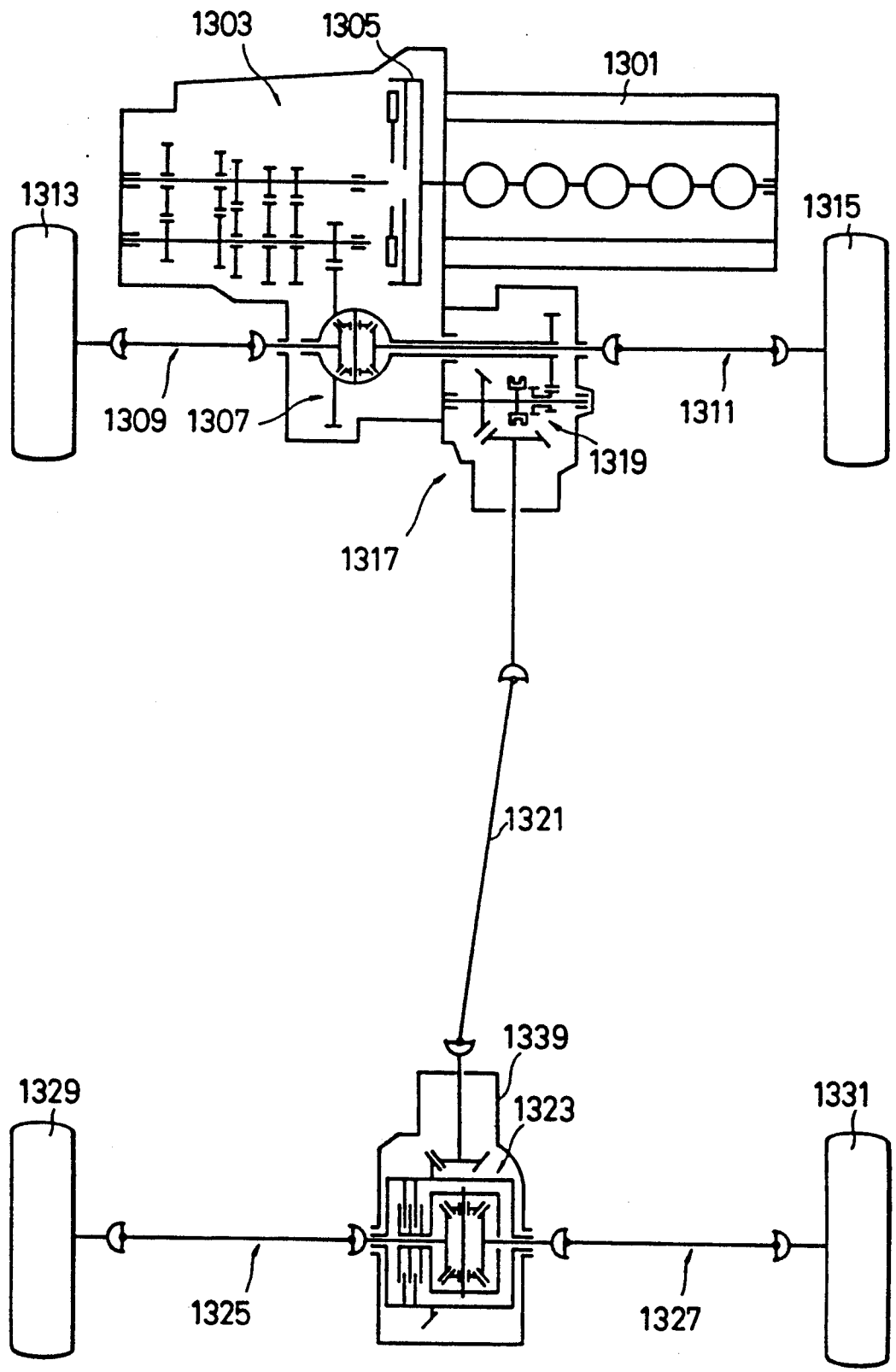
FIG. 26 is a skeletal view showing an automotive vehicle driving system to which an eleventh embodiment of the power transmission apparatus according to the present invention is applied.
Figure 27:
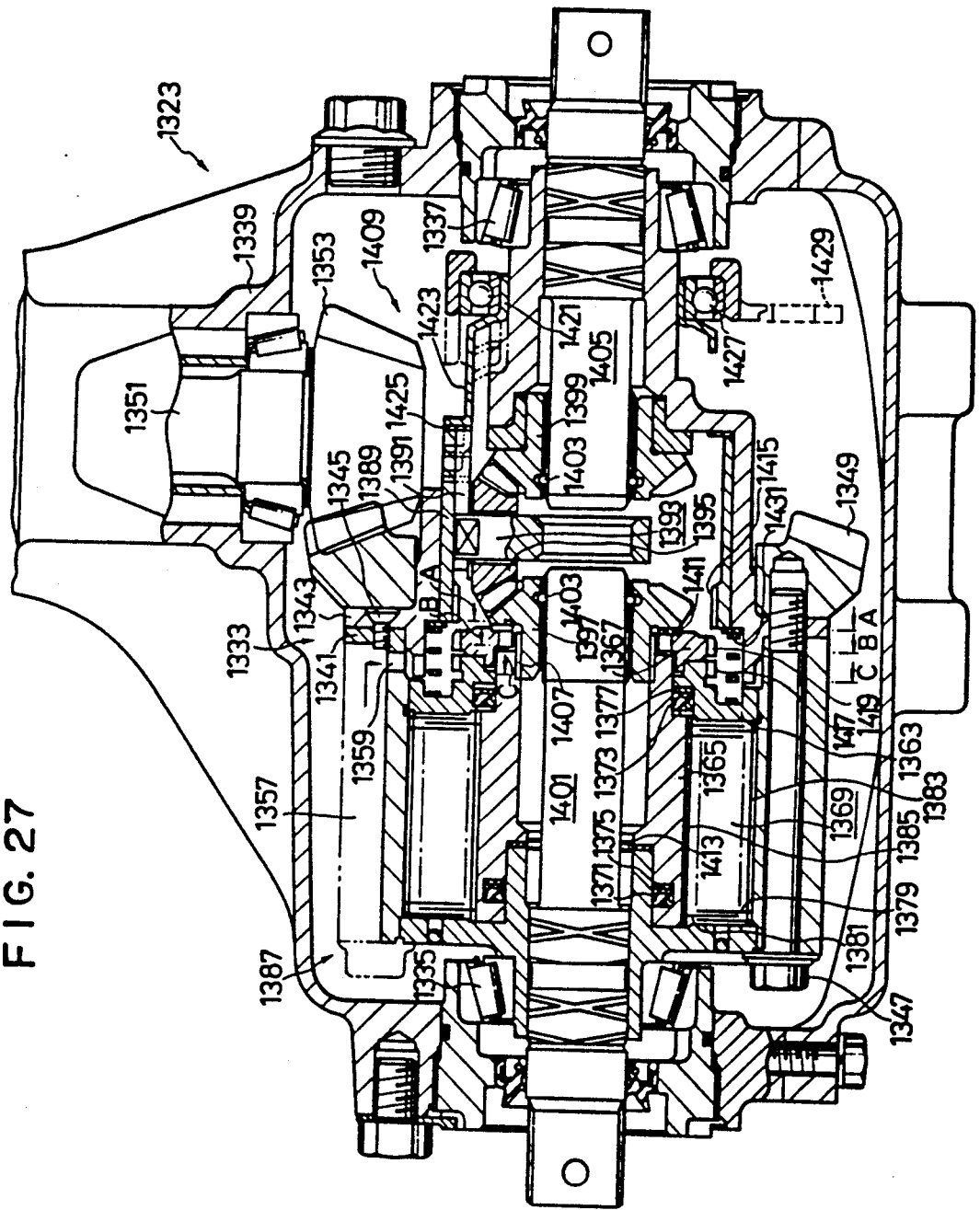
FIG. 27 is a cross-sectional view showing the eleventh embodiment of the power transmission apparatus.
Figure 28C:
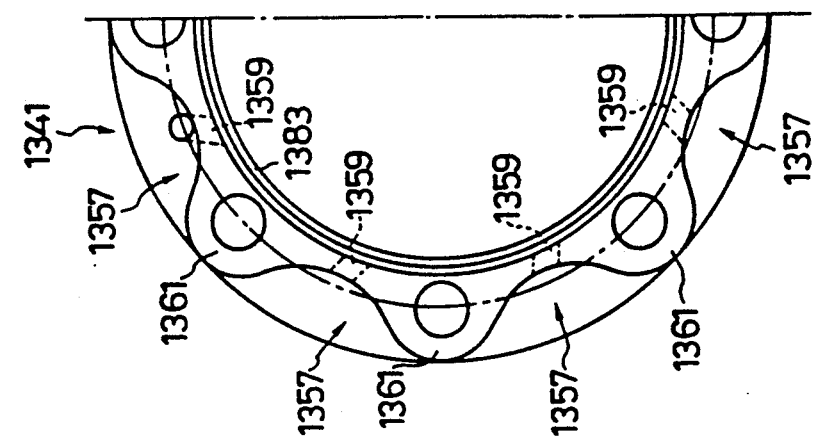
FIG. 28(c) is a side view of the case member when seen from the left side.
Figure 28B:
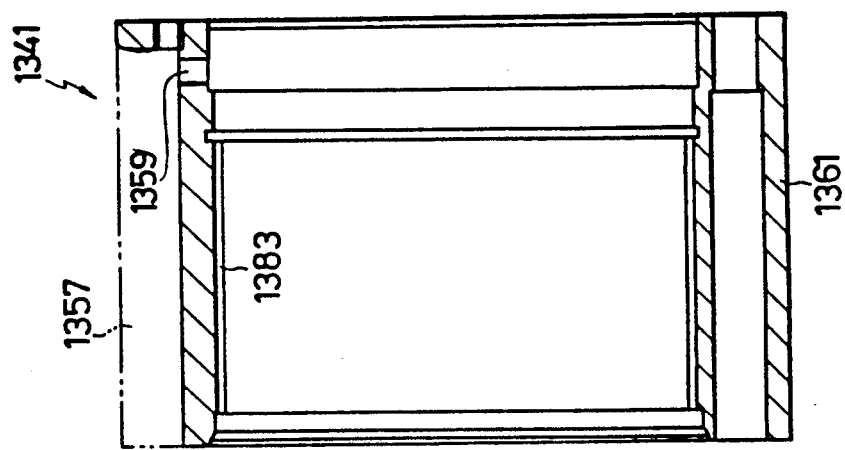
FIG. 28(a) is a side view of a case member when seen from the right side.
Figure 28A:
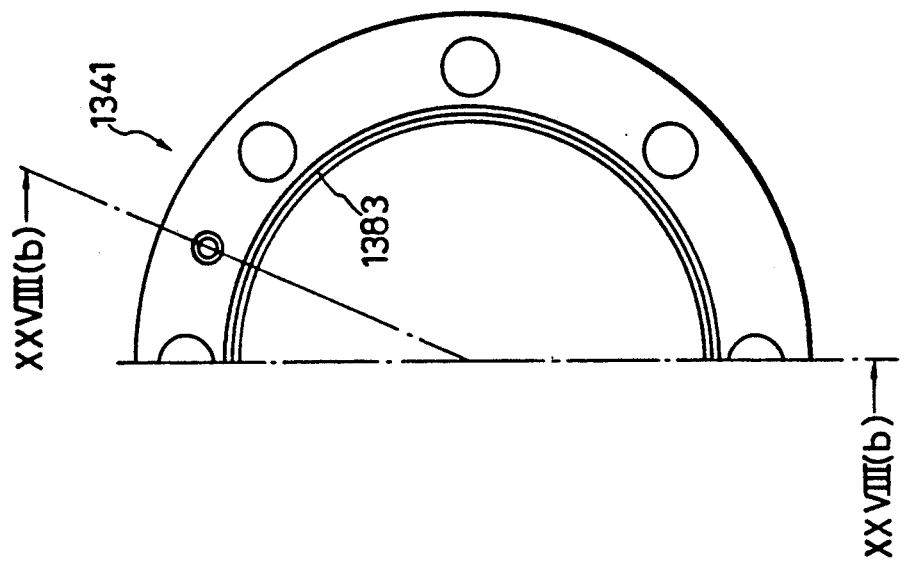

FIGS. 26 to 28 show an eleventh embodiment of the present invention. The power transmission apparatus of the present invention is used as a power system of a vehicle shown in FIG. 26. The upper side in FIG. 27 corresponds to the front side in FIG. 26. This power system is composed of an engine 1301, a transmission 1303, a clutch 1305, a front wheel side differential gear 1307, front wheel shafts 1309 and 1311, front wheels 1313 and 1315, a transfer 1317, a 2-4 switching device 1319 for disconnecting power from the rear wheels within the transfer 1317, a propeller shaft 1321, a rear differential gear 1323 (a power transmission apparatus of the present invention), rear wheel shafts 1325 and 1327, and rear wheels 1329 and 1331.

A differential case (housing) 1333 of the rear differential gear 1323 is rotatably supported by a differential carrier 1339 via bearings 1335 and 1337. The differential case 1333 is formed by connecting left and right case members 1341 and 1343 by screws 1345. The case members 1341 and 1343 are further fixed to a ring gear 1349 by bolts 1347. A drive pinion shaft 1351 connected to the propeller shaft side 1321 is rotatably supported by the differential carrier 1339. A drive pinion 1353 formed integral with the shaft 1351 is engaged with a ring gear 1349. As described above, the differential case 1333 is driven by an engine power. The differential carrier 1339 is filled with lubricant.

As shown in FIG. 28, the lefthand case 1341 of the differential case 1333 is formed with outer axial recessed portions 1357 at regular angular intervals and further with through holes 1359 in the recessed portions 1357. The through hole 1359 is inclined radially outwardly along the rotational direction of the differential case 1333 as shown in FIG. 28(c). Therefore, when the differential case 1333 starts rotating, the lubricant rotated and raised by the ring gear 1349 is introduced into the differential case 1333 through the recesses 1357 and the through holes 1359. An inclination of the through hole 1359 serves to promote the inward flow of lubricant into the case 1333. When the lubricant level is raised to such an extent that the convex portion 1361 of the case member 1341 is below the lubricant level, since the lubricant is directly raised by the convex portions 1361, it is possible to increase the amount of lubricant flowing toward the inside. When the differential case 1333 stops rotating, lubricant is accumulated within the recesses 1357 and flows inside via the through hole 1359.

A side wall member 1363 is welded to the inner right side of the case member 1341. A hub member 1365 is rotatably disposed within the case member 1341. A clutch ring 1367 connected to the hub member 1365 is disposed on the right side of the side wall member 1363.

A working chamber 1369 is formed between these members 1341, 1363, and 1365 and filled with a high viscous silicon oil. Its watertightness is attained by X-rings 1371 and 1373 and backup rings 1375 and 1377. A pair of plate assemblies composed of plural alternately arranged outer and inner plates 1379 and 1381 are engaged with splines 1383 of the casing 1341 and splines 1385 of the hub member 1365, separately to constitute a viscous coupling 1387.

When the differential case 1334 is rotated relative to the hub member 1365, this revolution is transmitted from the outer plates 1379 to the inner plates 1381 by a shearing force of the silicon oil to rotate the hub member 1365. In this case when a difference in rotative speed between the two members 1333 and 1365 is large, the rotational difference is restricted to transmit a large torque. When the difference is small, the rotational difference is absorbed to transmit a small torque.

Within the righthand case member 1343, a sleeve 1389 is rotatably and axially movably disposed. The sleeve 1389 is formed with axial grooves 1391 to which ends of the pinion shafts 1393 are engaged. Pinion gears 1395 are rotatably supported by the pinion shaft 1393. The pinion gears 1395 are engaged with a pair of side gears 1397 and 1399.

The lefthand side gear 1397 is spline engaged with a wheel shaft 1401 constituting a right end portion of a rear left side wheel shaft 1325, and fixed by a retainer 1403. The righthand side gear 1399 is spline engaged with a wheel shaft 1405 constituting a left end portion of a rear right side wheel shaft 1327 and fixed by a retainer 1403. A sliding bearing 1407 is disposed between the lefthand side gear 1397 and the hub member 1365 of the viscous coupling 1387. A differential gear assembly 1409 is thus constructed.

Therefore, when the sleeve 1389 rotates, power is differentially distributed to the two side gears 1397 and 1399 via the pinion shaft 1393 and the pinion gears 1395 owing to the self revolution of the gears 1395 to drive the rear wheels 1329 and 1331. Washers 1411 and 1413 are disposed between the gear 1397 and the clutch ring 1367 and between the hub member 1365 and the case member 1341 to receive a thrust force applied from the gear 1397 due to engagement between the gears 1397 and 1395.

Splines 1415 are formed on the left end inner circumference of the sleeve 1389, and other splines 1417 and 1419 engageable with the splines 1415 are formed on the outer circumferences of the side wall member 1363 and the clutch ring 1367.

A push member 1421 is axially slidably fitted to the outer circumference of a cylindrical portion provided on the right end of the case member 1343. The arm 1423 of the member 1421 is passed through the case member 1343 and pushes the sleeve 1389 via a washer 1425. This push member 1421 is connected to an actuator via a bearing 1427 and an operating member 1429. This actuator is operated manually by the driver or automatically according to steering conditions or road surface conditions. The actuator shifts the sleeve 1389 leftward via the push member 1421. Further, a return spring 1431 is disposed between the sleeve 1389 and the side wall member 1363 to return the sleeve 1389 rightward when the actuator is inoperative.

By the above-mentioned shift operation, the sleeve 1389 is shifted to a position A (the lower half in FIG. 27) where the sleeve 1389 is not engaged with both the side wall member 1363 and the clutch ring 1367, a position B where the sleeve 1389 is engaged with only the clutch ring 1367, and a position C where the sleeve 1389 is engaged with both the members 1363 and 1367.

When the sleeve 1389 is at position A, since the viscous coupling 1387 is disengaged from the differential gear assembly 1409, the elements from the rear wheel shafts 1325 and 1327 to the sleeve 1389 are rotated by the revolutional force of the rear wheels 1329 and 1331. At position B, engine power is transmitted to the differential gear assembly 1409 via the viscous coupling 1387.

At position C, engine power is directly transmitted from the differential case 1333 to the differential gear assembly 1409 bypassing the viscous coupling 1387.

Although the differential case 1333 stops by the 2-4 switching apparatus 1319 at position A, lubricant flows as shown by the arrow through the through holes 1359 formed in the differential case 1333 disposed between the viscous coupling 1387 and the differential gear assembly 1409, so that the sliding portions between the stopped elements and the rotating elements, for instance, such as between the outer circumference of the sleeve 1389 and the inner circumference of the differential case 1333, the mounting portion of the return spring 1431, the sliding bearing 1407, the washers 1411, 1413, and 1425 can be lubricated.

At position B, the sliding portion between the side wall member 1363 and the clutch ring 1367 can be lubricated by the operation of the viscous coupling 1387. The differential gear assembly 1409 can be lubricated at each position A, B or C.

The function will be explained in relation to a vehicle shown in FIG. 26.

When the 2-4 switching device 1319 is engaged and the rear differential gear 1323 is set to position B or C, the vehicle is driven in 4WD mode. At position C, power is transmitted bypassing the viscous coupling 1387, so that it is possible to improve the fuel consumption rate and the straight travelling stability. At position B, since power is transmitted to the rear wheels via the viscous coupling 1387, the turning performance can be improved, and the vehicle is driven substantially in front wheel drive mode on a paved road and automatically in 4WD mode on a muddy road. Further, tight corner braking phenomenon can also be prevented.

When the apparatus 1323 is set to position A, the vehicle is driven in front wheel drive mode, so that the fuel consumption rate can be improved. Further, when the 2-4 switching device 1319 is disengaged, since the propeller shaft 1321 stops rotating, it is possible to reduce the abrasion of the rotating elements, noise, vibration, etc., thus improving the fuel consumption rate.

what is claimed is:

1. A power transmission apparatus comprising:
   (a) a housing rotatably supported and adapted to be driven by an external force;
   (b) an inner hub rotatably supported within said housing;
   (c) a viscous coupling device disposed between an inner circumference of said housing and an outer circumference of said inner hub on one side of and within said housing, for viscously restricting relative rotational motion between said housing and said inner hub;
   (d) a differential case disposed on the other side of and within said housing, said differential case being axially shiftable into and out of engagement with said inner hub; and
   (e) a differential gear assembly disposed within said differential case and connected to a first shaft and a second shaft, the engagement of said differential case with said inner hub resulting in the external force applied to said housing being transmitted via said viscous coupling device, said inner hub and said differential case to said differential gear assembly for differential distribution to the first and second shafts, and the disengagement of said differential case from said inner hub allowing the first and second shafts to rotate free of the influence of said external drive force.

* * * * *